United States Patent
Zemla et al.

(10) Patent No.: US 11,808,098 B2
(45) Date of Patent: Nov. 7, 2023

(54) SYSTEM AND METHOD TO DEPLOY AND CONTROL AUTONOMOUS DEVICES

(71) Applicant: DynaEnergetics Europe GmbH, Troisdorf (DE)

(72) Inventors: Andreas Robert Zemla, Much (DE); Christian Eitschberger, Munich (DE); Liam McNelis, Bonn (DE); Thilo Scharf, Donegal (IE); Shmuel Silverman, Novato, CA (US)

(73) Assignee: DynaEnergetics Europe GmbH, Troisdorf (DE)

( * ) Notice: Subject to any disclaimer, the term of this patent is extended or adjusted under 35 U.S.C. 154(b) by 314 days.

(21) Appl. No.: 17/269,871

(22) PCT Filed: Aug. 16, 2019

(86) PCT No.: PCT/EP2019/072055
§ 371 (c)(1),
(2) Date: Feb. 19, 2021

(87) PCT Pub. No.: WO2020/038848
PCT Pub. Date: Feb. 27, 2020

(65) Prior Publication Data
US 2021/0254456 A1    Aug. 19, 2021

Related U.S. Application Data

(60) Provisional application No. 62/719,816, filed on Aug. 20, 2018.

(51) Int. Cl.
E21B 23/00    (2006.01)
E21B 47/12    (2012.01)
(Continued)

(52) U.S. Cl.
CPC .............. *E21B 23/00* (2013.01); *E21B 47/06* (2013.01); *E21B 47/138* (2020.05);
(Continued)

(58) Field of Classification Search
CPC .... E21B 47/138; E21B 47/06; E21B 43/1185; E21B 23/00; E21B 23/001; E21B 33/068;
(Continued)

(56) References Cited

U.S. PATENT DOCUMENTS 2,216,359 A    10/1940    Spencer
2,358,466 A     9/1944    Miller
(Continued)

FOREIGN PATENT DOCUMENTS

CA    2821506 A1    1/2015
CN    85107897 A    9/1986
(Continued)

OTHER PUBLICATIONS

Owen Oil Tools, Recommended Practice for Oilfield Explosive Safety, Presented at 2011 MENAPS Middle East and North Africa Perforating Symposium, Nov. 28-30, 2011, 6 pages.
(Continued)

*Primary Examiner* — Brad Harcourt
(74) *Attorney, Agent, or Firm* — Womble Bond Dickinson (US) LLP

(57) ABSTRACT

A system for deploying an untethered drone is provided. The system includes a wellbore drone for being deployed into a wellbore, a magazine unit, and a control system. The wellbore drone is configured to perform at least one action based on a control command which is provided from an on-board control system embedded in the wellbore drone. The magazine unit includes one or more chambers. The magazine unit is configured to retain the wellbore drone in a corresponding one of the one or more chambers, prior to deployment of the
(Continued)

wellbore drone into the wellbore, and dispense the wellbore drone for being deployed into the wellbore through a launcher unit. The control system includes at least one control interface for controlling at least a part of operations of the wellbore drone and the magazine unit.

16 Claims, 16 Drawing Sheets

(51) Int. Cl.
E21B 47/06 (2012.01)
G05D 1/00 (2006.01)

(52) U.S. Cl.
CPC ......... *G05D 1/0022* (2013.01); *G05D 1/0088* (2013.01); *G05D 2201/0207* (2013.01)

(58) Field of Classification Search
CPC ............... G05D 1/0022; G05D 1/0088; G05D 2201/0207
See application file for complete search history.

(56) References Cited

U.S. PATENT DOCUMENTS

| | | | |
|---|---|---|---|
| 2,418,486 A | 4/1947 | Smylie |
| 2,519,116 A | 8/1950 | Crake |
| 2,550,004 A | 4/1951 | Henri-Georges |
| 2,621,744 A | 12/1952 | Toelke |
| 2,696,258 A | 12/1954 | Greene |
| 2,873,675 A | 2/1959 | Lebourg |
| 2,889,775 A | 6/1959 | Owen |
| 3,155,164 A | 11/1964 | Keener |
| 3,170,400 A | 2/1965 | Nelson |
| 3,233,674 A | 2/1966 | Kurt |
| 3,246,707 A | 4/1966 | Bell |
| 3,374,735 A | 3/1968 | Moore |
| 3,504,723 A | 4/1970 | Cushman et al. |
| 3,859,921 A | 1/1975 | Stephenson |
| 4,007,790 A | 2/1977 | Henning |
| 4,007,796 A | 2/1977 | Boop |
| 4,058,061 A | 11/1977 | Mansur, Jr. et al. |
| 4,140,188 A | 2/1979 | Wann |
| 4,182,216 A | 1/1980 | DeCaro |
| 4,266,613 A | 5/1981 | Boop |
| 4,290,486 A | 9/1981 | Regalbuto |
| 4,491,185 A | 1/1985 | McClure |
| 4,496,008 A | 1/1985 | Pottier et al. |
| 4,523,650 A | 6/1985 | Sehnert et al. |
| 4,574,892 A | 3/1986 | Grigar et al. |
| 4,598,775 A | 7/1986 | Vann et al. |
| 4,619,320 A | 10/1986 | Adnyana et al. |
| 4,621,396 A | 11/1986 | Walker et al. |
| 4,657,089 A | 4/1987 | Stout |
| 4,747,201 A | 5/1988 | Donovan et al. |
| 4,753,170 A | 6/1988 | Regalbuto et al. |
| 4,776,393 A | 10/1988 | Forehand et al. |
| 4,790,383 A | 12/1988 | Savage et al. |
| 4,800,815 A | 1/1989 | Appledorn et al. |
| 4,808,925 A | 2/1989 | Baird |
| 4,884,506 A | 12/1989 | Guerreri |
| 4,889,183 A | 12/1989 | Sommers et al. |
| 5,027,708 A | 7/1991 | Gonzalez et al. |
| 5,052,489 A | 10/1991 | Carisella et al. |
| 5,060,573 A | 10/1991 | Montgomery et al. |
| 5,088,413 A | 2/1992 | Huber |
| 5,105,742 A | 4/1992 | Sumner |
| 5,115,196 A | 5/1992 | Low et al. |
| 5,159,145 A | 10/1992 | Carisella et al. |
| 5,322,019 A | 6/1994 | Hyland |
| 5,392,860 A | 2/1995 | Ross |
| 5,436,791 A | 7/1995 | Turano et al. |
| 5,603,384 A | 2/1997 | Bethel et al. |
| 5,703,319 A | 12/1997 | Fritz et al. |
| 5,775,426 A | 7/1998 | Snider et al. |
| 5,816,343 A | 10/1998 | Markel et al. |
| 5,992,289 A | 11/1999 | George et al. |
| 6,006,833 A | 12/1999 | Burleson et al. |
| 6,012,525 A | 1/2000 | Burleson et al. |
| 6,112,666 A | 9/2000 | Murray et al. |
| 6,164,375 A | 12/2000 | Carisella |
| 6,173,606 B1 | 1/2001 | Mosley |
| 6,298,915 B1 | 10/2001 | George |
| 6,305,287 B1 | 10/2001 | Capers et al. |
| 6,333,699 B1 | 12/2001 | Zierolf |
| 6,354,374 B1 | 3/2002 | Edwards et al. |
| 6,412,573 B2 | 7/2002 | Vaynshteyn |
| 6,414,905 B1 | 7/2002 | Owens et al. |
| 6,418,853 B1 | 7/2002 | Duguet et al. |
| 6,454,011 B1* | 9/2002 | Schempf ............... E21B 19/143 166/70 |
| 6,464,011 B2 | 10/2002 | Tubel |
| 6,467,387 B1 | 10/2002 | Espinosa et al. |
| 6,584,406 B1 | 6/2003 | Harmon et al. |
| 6,588,267 B1 | 7/2003 | Bradley |
| 6,651,747 B2 | 11/2003 | Chen et al. |
| 6,739,265 B1 | 5/2004 | Badger et al. |
| 6,742,602 B2 | 6/2004 | Trotechaud |
| 6,752,083 B1 | 6/2004 | Lerche et al. |
| 6,763,883 B2 | 7/2004 | Green et al. |
| 6,779,605 B2 | 8/2004 | Jackson |
| 6,820,693 B2 | 11/2004 | Hales et al. |
| 6,843,317 B2 | 1/2005 | Mackenzie |
| 6,966,262 B2 | 11/2005 | Jennings, III |
| 6,988,449 B2 | 1/2006 | Teowee et al. |
| 7,082,877 B2 | 8/2006 | Jennings, III |
| 7,147,068 B2 | 12/2006 | Vail, III |
| 7,193,527 B2 | 3/2007 | Hall |
| 7,217,917 B1 | 5/2007 | Tumlin et al. |
| 7,322,416 B2 | 1/2008 | Burris, II et al. |
| 7,331,394 B2 | 2/2008 | Edwards et al. |
| 7,387,162 B2 | 6/2008 | Mooney, Jr. et al. |
| 7,510,017 B2 | 3/2009 | Howell et al. |
| 7,568,429 B2 | 8/2009 | Hummel et al. |
| 7,617,775 B2 | 11/2009 | Teowee |
| 7,681,500 B2 | 3/2010 | Teowee |
| 7,762,172 B2 | 7/2010 | Li et al. |
| 7,778,006 B2 | 8/2010 | Stewart et al. |
| 7,810,430 B2 | 10/2010 | Chan et al. |
| 7,870,825 B2 | 1/2011 | Teowee |
| 7,908,970 B1 | 3/2011 | Jakaboski et al. |
| 7,913,603 B2 | 3/2011 | LaGrange et al. |
| 7,929,270 B2 | 4/2011 | Hummel et al. |
| 7,980,309 B2 | 7/2011 | Crawford |
| 8,066,083 B2 | 11/2011 | Hales et al. |
| 8,069,789 B2 | 12/2011 | Hummel et al. |
| 8,074,713 B2 | 12/2011 | Ramos et al. |
| 8,091,477 B2 | 1/2012 | Brooks et al. |
| 8,157,022 B2 | 4/2012 | Bertoja et al. |
| 8,165,714 B2 | 4/2012 | Mier et al. |
| 8,181,718 B2 | 5/2012 | Burleson et al. |
| 8,182,212 B2 | 5/2012 | Parcell |
| 8,186,259 B2 | 5/2012 | Burleson et al. |
| 8,256,337 B2 | 9/2012 | Hill |
| 8,336,437 B2 | 12/2012 | Barlow et al. |
| 8,395,878 B2 | 3/2013 | Stewart et al. |
| 8,451,137 B2 | 5/2013 | Bonavides et al. |
| 8,505,632 B2 | 8/2013 | Guerrero et al. |
| 8,576,090 B2 | 11/2013 | Lerche et al. |
| 8,646,520 B2 | 2/2014 | Chen |
| 8,661,978 B2 | 3/2014 | Backhus et al. |
| 8,695,506 B2 | 4/2014 | Lanclos |
| 8,810,247 B2 | 8/2014 | Kuckes |
| 8,863,665 B2 | 10/2014 | DeVries et al. |
| 8,875,787 B2 | 11/2014 | Tassaroli |
| 8,881,816 B2 | 11/2014 | Glenn et al. |
| 8,884,778 B2 | 11/2014 | Lerche et al. |
| 8,899,322 B2 | 12/2014 | Cresswell et al. |
| 8,950,480 B1 | 2/2015 | Strickland |
| 8,981,957 B2 | 3/2015 | Gano et al. |
| 9,062,539 B2 | 6/2015 | Schmidt et al. |
| 9,080,433 B2 | 7/2015 | Lanclos et al. |
| 9,181,790 B2 | 11/2015 | Mace et al. |

(56) References Cited

U.S. PATENT DOCUMENTS

| | | |
|---|---|---|
| 9,194,219 B1 | 11/2015 | Hardesty et al. |
| 9,284,819 B2 | 3/2016 | Tolman et al. |
| 9,317,038 B2 | 4/2016 | Ozick et al. |
| 9,328,577 B2 | 5/2016 | Hallundbaek et al. |
| 9,359,884 B2 | 6/2016 | Hallundbaek et al. |
| 9,441,470 B2 | 9/2016 | Guerrero et al. |
| 9,464,508 B2 | 10/2016 | Lerche et al. |
| 9,476,289 B2 | 10/2016 | Wells |
| 9,494,021 B2 | 11/2016 | Parks et al. |
| 9,518,454 B2 | 12/2016 | Current et al. |
| 9,556,725 B2 | 1/2017 | Fripp et al. |
| 9,581,422 B2 | 2/2017 | Preiss et al. |
| 9,593,548 B2 | 3/2017 | Hill et al. |
| 9,598,942 B2 | 3/2017 | Wells et al. |
| 9,605,937 B2 | 3/2017 | Eitschberger et al. |
| 9,617,814 B2 | 4/2017 | Seals et al. |
| 9,617,829 B2 | 4/2017 | Dale et al. |
| 9,677,363 B2 | 6/2017 | Schacherer et al. |
| 9,726,005 B2 | 8/2017 | Hallundbaek et al. |
| 9,784,549 B2 | 10/2017 | Eitschberger |
| 9,797,238 B2 | 10/2017 | Frosell et al. |
| 9,835,428 B2 | 12/2017 | Mace et al. |
| 9,896,920 B2 | 2/2018 | Holder |
| 9,903,192 B2 | 2/2018 | Entchev et al. |
| 9,963,955 B2 | 5/2018 | Tolman et al. |
| 10,001,007 B2 | 6/2018 | Pelletier et al. |
| 10,053,968 B2 | 8/2018 | Tolman et al. |
| 10,066,921 B2 | 9/2018 | Eitschberger |
| 10,077,641 B2 | 9/2018 | Rogman et al. |
| 10,138,713 B2 | 11/2018 | Tolman et al. |
| 10,151,180 B2 | 12/2018 | Robey et al. |
| 10,167,534 B2 | 1/2019 | Fripp et al. |
| 10,190,398 B2 | 1/2019 | Goodman et al. |
| 10,287,873 B2 | 5/2019 | Filas et al. |
| 10,301,910 B2 | 5/2019 | Whitsitt et al. |
| 10,352,144 B2 | 7/2019 | Entchev et al. |
| 10,458,213 B1 | 10/2019 | Eitschberger et al. |
| 10,605,037 B2 | 3/2020 | Eitschberger et al. |
| 10,689,955 B1 | 6/2020 | Mauldin et al. |
| 10,844,684 B2 | 11/2020 | Eitschberger |
| 2002/0020320 A1 | 2/2002 | Lebaudy et al. |
| 2002/0040783 A1 | 4/2002 | Zimmerman et al. |
| 2002/0062991 A1 | 5/2002 | Farrant et al. |
| 2002/0066556 A1* | 6/2002 | Goode ............... E21B 47/001 166/70 |
| 2003/0000411 A1 | 1/2003 | Cernocky et al. |
| 2003/0001753 A1 | 1/2003 | Cernocky et al. |
| 2003/0234110 A1* | 12/2003 | McGregor ........... G01V 11/002 166/381 |
| 2004/0094305 A1 | 5/2004 | Skjærseth et al. |
| 2004/0216632 A1 | 11/2004 | Finsterwald |
| 2004/0239521 A1 | 12/2004 | Zierolf |
| 2005/0011645 A1 | 1/2005 | Aronstam et al. |
| 2005/0178282 A1 | 8/2005 | Brooks et al. |
| 2005/0194146 A1 | 9/2005 | Barker et al. |
| 2005/0217844 A1 | 10/2005 | Edwards et al. |
| 2005/0229805 A1 | 10/2005 | Myers, Jr. et al. |
| 2005/0269083 A1 | 12/2005 | Burris, II et al. |
| 2007/0084336 A1 | 4/2007 | Neves |
| 2007/0125540 A1 | 6/2007 | Gerez et al. |
| 2008/0047456 A1 | 2/2008 | Li et al. |
| 2008/0110612 A1 | 5/2008 | Prinz et al. |
| 2008/0134922 A1 | 6/2008 | Grattan et al. |
| 2008/0149338 A1 | 6/2008 | Goodman et al. |
| 2008/0173204 A1 | 7/2008 | Anderson et al. |
| 2008/0264639 A1 | 10/2008 | Parrott et al. |
| 2009/0050322 A1 | 2/2009 | Hill et al. |
| 2009/0301723 A1 | 12/2009 | Gray |
| 2010/0000789 A1 | 1/2010 | Barton et al. |
| 2010/0089643 A1 | 4/2010 | Vidal |
| 2010/0163224 A1 | 7/2010 | Strickland |
| 2010/0206064 A1 | 8/2010 | Stes |
| 2010/0230104 A1 | 9/2010 | Nölke et al. |
| 2011/0024116 A1 | 2/2011 | McCann et al. |
| 2012/0085538 A1 | 4/2012 | Guerrero et al. |
| 2012/0199031 A1 | 8/2012 | Lanclos |
| 2012/0199352 A1 | 8/2012 | Lanclos et al. |
| 2012/0241169 A1 | 9/2012 | Hales et al. |
| 2012/0242135 A1 | 9/2012 | Thomson et al. |
| 2012/0247769 A1 | 10/2012 | Schacherer et al. |
| 2012/0247771 A1 | 10/2012 | Black et al. |
| 2012/0298361 A1 | 11/2012 | Sampson |
| 2013/0062055 A1 | 3/2013 | Tolman et al. |
| 2013/0112396 A1 | 5/2013 | Splittstoeßer |
| 2013/0118342 A1 | 5/2013 | Tassaroli |
| 2013/0199843 A1 | 8/2013 | Ross |
| 2013/0248174 A1 | 9/2013 | Dale et al. |
| 2014/0000877 A1 | 1/2014 | Robertson et al. |
| 2014/0131035 A1 | 5/2014 | Entchev et al. |
| 2014/0218207 A1 | 8/2014 | Gano et al. |
| 2015/0075770 A1* | 3/2015 | Fripp ..................... E21B 47/13 166/65.1 |
| 2015/0176386 A1 | 6/2015 | Castillo et al. |
| 2015/0308208 A1 | 10/2015 | Capps et al. |
| 2015/0330192 A1 | 11/2015 | Rogman et al. |
| 2016/0040520 A1 | 2/2016 | Tolman et al. |
| 2016/0061572 A1 | 3/2016 | Eitschberger et al. |
| 2016/0069163 A1 | 3/2016 | Tolman et al. |
| 2016/0084075 A1* | 3/2016 | Ingraham ............... E21B 23/01 166/53 |
| 2016/0108722 A1 | 4/2016 | Whitsitt et al. |
| 2016/0168961 A1 | 6/2016 | Parks et al. |
| 2017/0030186 A1* | 2/2017 | Rodgers ................. E21B 47/07 |
| 2017/0030693 A1 | 2/2017 | Preiss et al. |
| 2017/0044875 A1 | 2/2017 | Hebebrand et al. |
| 2017/0067303 A1 | 3/2017 | Thiemann et al. |
| 2017/0138150 A1 | 5/2017 | Yencho |
| 2017/0145798 A1 | 5/2017 | Robey et al. |
| 2017/0175488 A1 | 6/2017 | Lisowski et al. |
| 2017/0211363 A1 | 7/2017 | Bradley et al. |
| 2017/0226814 A1 | 8/2017 | Clemens et al. |
| 2017/0241244 A1 | 8/2017 | Barker et al. |
| 2017/0268326 A1 | 9/2017 | Tao et al. |
| 2017/0268860 A1 | 9/2017 | Eitschberger |
| 2017/0314372 A1 | 11/2017 | Tolman et al. |
| 2017/0357021 A1 | 12/2017 | Valero et al. |
| 2018/0030334 A1 | 2/2018 | Collier et al. |
| 2018/0135398 A1 | 5/2018 | Entchev et al. |
| 2018/0148995 A1 | 5/2018 | Burky et al. |
| 2018/0156029 A1 | 6/2018 | Harrison et al. |
| 2018/0209251 A1 | 7/2018 | Robey et al. |
| 2018/0274342 A1 | 9/2018 | Sites |
| 2018/0299239 A1 | 10/2018 | Eitschberger et al. |
| 2018/0305993 A1 | 10/2018 | Perkins et al. |
| 2018/0318770 A1 | 11/2018 | Eitschberger et al. |
| 2018/0340412 A1 | 11/2018 | Singh et al. |
| 2019/0031307 A1 | 1/2019 | Siersdorfer |
| 2019/0032470 A1 | 1/2019 | Harrigan |
| 2019/0040722 A1 | 2/2019 | Yang et al. |
| 2019/0048693 A1 | 2/2019 | Henke et al. |
| 2019/0049225 A1 | 2/2019 | Eitschberger |
| 2019/0085685 A1 | 3/2019 | McBride |
| 2019/0195054 A1 | 6/2019 | Bradley et al. |
| 2019/0211655 A1 | 7/2019 | Bradley et al. |
| 2019/0218880 A1 | 7/2019 | Cannon et al. |
| 2019/0284889 A1 | 9/2019 | LaGrange et al. |
| 2019/0292886 A1 | 9/2019 | Shahinpour et al. |
| 2019/0292887 A1 | 9/2019 | Austin, II et al. |
| 2019/0316449 A1 | 10/2019 | Schultz et al. |
| 2019/0368301 A1 | 12/2019 | Eitschberger et al. |
| 2019/0368321 A1 | 12/2019 | Eitschberger et al. |
| 2019/0368331 A1 | 12/2019 | Vick, Jr. et al. |
| 2020/0018139 A1 | 1/2020 | Eitschberger et al. |
| 2020/0063553 A1 | 2/2020 | Zemla et al. |
| 2020/0088011 A1 | 3/2020 | Eitschberger et al. |
| 2020/0332618 A1 | 10/2020 | Eitschberger et al. |
| 2021/0040809 A1 | 2/2021 | Eitschberger |
| 2021/0123330 A1 | 4/2021 | Eitschberger et al. |

FOREIGN PATENT DOCUMENTS

| | | |
|---|---|---|
| CN | 101397890 A | 4/2009 |
| CN | 101435829 A | 5/2009 |
| CN | 201546707 U | 8/2010 |

(56) References Cited

FOREIGN PATENT DOCUMENTS

| | | |
|---|---|---|
| CN | 201620848 U | 11/2010 |
| EP | 1688584 B1 | 8/2011 |
| EP | 2952675 A2 | 9/2015 |
| GB | 839486 A | 6/1960 |
| GB | 2383236 B | 1/2004 |
| GB | 2548101 A | 9/2017 |
| RU | 2633904 C1 | 10/2017 |
| WO | 0159401 A1 | 8/2001 |
| WO | 2001059401 A1 | 8/2001 |
| WO | 2009091422 A2 | 7/2009 |
| WO | 2011051435 A2 | 5/2011 |
| WO | 2011146866 A2 | 11/2011 |
| WO | 2011150251 A1 | 12/2011 |
| WO | 2012006357 A2 | 1/2012 |
| WO | 2012106640 A3 | 11/2012 |
| WO | 2012149584 A1 | 11/2012 |
| WO | 2012161854 A2 | 11/2012 |
| WO | 2014007843 A1 | 1/2014 |
| WO | 2014046670 A1 | 3/2014 |
| WO | 2014089194 A1 | 6/2014 |
| WO | 2014193397 A1 | 12/2014 |
| WO | 2015006869 A1 | 1/2015 |
| WO | 2015028204 A2 | 3/2015 |
| WO | 2015028204 A3 | 3/2015 |
| WO | 2015134719 A1 | 9/2015 |
| WO | 2015196095 A1 | 12/2015 |
| WO | 2016100064 A1 | 6/2016 |
| WO | 2017147329 A1 | 8/2017 |
| WO | 2018009223 A1 | 1/2018 |
| WO | 2018067598 A1 | 4/2018 |
| WO | 2018182565 A1 | 10/2018 |
| WO | 2019180462 A1 | 9/2019 |

OTHER PUBLICATIONS

Salt Warren et al.; New Perforating Gun System Increases Safety and Efficiency; dated Apr. 1, 2016; 11 pages.
Schlumberger & Said Abubakr, Combining and Customizing Technologies for Perforating Horizontal Wells in Algeria, Presented at 2011 MENAPS, Nov. 28-30, 2011, 20 pages.
Schlumberger, eFire-TCP Firing Head Enabled by Muzic Telemetry, 2016, 2 pgs., www.slb.com/perforating.
Smylie, Tom, New Safe and Secure Detonators for the Industry's consideration, presented at Explosives Safety & Security Conference, Marathon Oil Co, Houston; Feb. 23-24, 2005, 20 pages.
U.S. Patent Trial and Appeal Board, Institution of Inter Partes Review of U.S. Pat. No. 9581422, Case IPR2018-00600,Aug. 21, 2018, 9 pages.
United States District Court for the Southern District of Texas Houston Division, Case 4:19-cv-01611 for U.S. Pat. No. 9,581,422B2, Plaintiff's Complaint and Exhibits, dated May 2, 2019, 26 pgs.
United States District Court for the Southern District of Texas Houston Division, Case 4:19-cv-01611 for U.S. Pat. No. 9,581,422B2, Defendant's Answers, Counterclaims and Exhibits, dated May 28, 2019, 135 pgs.
United States District Court for the Southern District of Texas Houston Division, Case 4:19-cv-01611 for U.S. Pat. No. 9,581,422B2, Plaintiffs' Motion to Dismiss and Exhibits, dated Jun. 17, 2019, 63 pgs.
United States Patent and Trademark Office, Case IPR2018-00600 for U.S. Pat. No. 9,581,422 B2, Reply In Support of Patent Owner's Motion to Amend, dated Mar. 21, 2019, 15 pgs.
United States Patent and Trademark Office, Case IPR2018-00600 for U.S. Pat. No. 9,581,422 B2, Decision of Precedential Opinion Panel, Granting Patent Owner's Request for Hearing and Granting Patent Owner's Motion to Amend, dated Jul. 6, 2020, 27 pgs.
United States Patent and Trademark Office, Case IPR2018-00600 for U.S. Pat. No. 9,581,422 B2, Petitioner's Reply Briefing to the Precedential Opinion Panel, dated Jan. 6, 2020, 17 pgs.
United States Patent and Trademark Office, Case IPR2018-00600 for U.S. Pat. No. 9,581,422 B2, Petitioner's Reply in Inter Partes Review of U.S. Pat. No. 9,581,422, dated Mar. 7, 2019, 44 pgs.

United States Patent and Trademark Office, Final Office Action of U.S. Appl. No. 16/542,890, dated May 12, 2020, 16 pgs.
United States Patent and Trademark Office, Final Office Action of U.S. Appl. No. 16/423,230, dated Nov. 4, 2019, 14 pgs.
United States Patent and Trademark Office, Non-final Office Action of U.S. Appl. No. 16/451,440, dated Oct. 24, 2019, 22 pgs.
United States Patent and Trademark Office, Notice of Allowance for U.S. Appl. No. 16/788,107, dated Jul. 30, 2020, 9 pgs.
United States Patent and Trademark Office, Office Action of U.S. Appl. No. 16/423,230, dated Aug. 27, 2019, 16 pgs.
United States Patent and Trademark Office; Final Office Action for U.S. Appl. No. 16/451,440; dated Feb. 7, 2020; 11 pages.
United States Patent and Trademark Office; Non-Final Office Action for U.S. Appl. No. 16/542,890; dated Nov. 4, 2019; 16 pages.
United States Patent and Trademark Office; Non-Final Office Action for U.S. Appl. No. 16/542,890; dated Sep. 30, 2020; 17 pages.
United States Patent and Trademark Office; Notice of Allowance for U.S. Appl. No. 16/451,440; dated Jun. 5, 2020; 8 pages.
United States Patent and Trademark Office; Requirement for Restriction/Election for U.S. Appl. No. 16/537,720; dated Apr. 27, 2021; 8 pages.
USPTO, Notice of Allowance for U.S. Appl. No. 16/423,230, dated Nov. 27, 2019, 7 pgs.
USPTO, Office Action of U.S. Appl. No. 16/788,107, dated Apr. 6, 2020, 15 pgs.
Amit Govil, Selective Perforation: A Game Changer in Perforating Technology—Case Study, presented at the 2012 European and West African Perforating Symposium, Schlumberger, Nov. 7-9, 2012, 14 pgs.
Austin Powder Company; A-140 F & Block, Detonator & Block Assembly; Jan. 5, 2017; 2 pgs.; https://www.austinpowder.com/wp-content/uploads/2019/01/OilStar_A140Fbk-2.pdf.
Baker Hughes, Long Gun Deployment Systems IPS-12-28; 2012 International Perforating Symposium; Apr. 26-27, 2011; 11 pages.
Baker Hughes; SurePerf Rapid Select-Fire System Perforate production zones in a single run; 2012; 2 pages.
Dynaenergetics, DYNAselect Electronic Detonator 0015 SFDE RDX 1.4B, Product Information, Dec. 16, 2011, 1 pg.
Dynaenergetics, DYNAselect Electronic Detonator 0015 SFDE RDX 1.4S, Product Information, Dec. 16, 2011, 1 pg.
Dynaenergetics, DYNAselect System, information downloaded from website, Jul. 3, 2013, 2 pages, http://www.dynaenergetics.com/.
Dynaenergetics, Electronic Top Fire Detonator, Product Information Sheet, Jul. 30, 2013, 1 pg.
Dynaenergetics, Gun Assembly, Product Summary Sheet, May 7, 2004, 1 page.
Dynaenergetics, Selective Perforating Switch, information downloaded from website, Jul. 3, 2013, 2 pages, http://www.dynaenergetics.com/.
Dynaenergetics, Selective Perforating Switch, Product Information Sheet, May 27, 2011, 1 pg.
Entchev et al., Autonomous Perforating System for Multizone Completions, SPE International, 2011, 7 pgs., https://www.onepetro.org/conference-paper/SPE-147296-MS.
Ge Oil & Gas, Pipe Recovery Technology & Wireline Accessories, 2013, 435 pages.
Gilliat et al.; New Select-Fire System: Improved Reliability and Safety in Select Fire Operations; 2012; 16 pgs.
Giromax Directional, Gyroscopic and magnetic borehole surveying systems with outstanding quality andreliability, Feb. 14, 2016, 4 pgs., https://www.gyromax.com.au/inertial-sensing.html.
GR Energy Services, ZipRelease Addressable Wireline Release Tool, Dec. 8, 2016, 2 pgs.,https://grenergyservices.com/completion-services/perforating/addressable-wireline-release.
Halliburtion, World's first acoustic firing head system allows safer and more flexible TCP operations, Aug. 2015, 2 pgs., https://www.halliburton.com/content/dam/ps/public/lp/contents/Case_Histories/web/acoustic-firing-tcp.pdf.
Halliburton, Maxfire Electronic Firing Systems, Nov. 2014, 7 pgs., https://www.halliburton.com/content/dam/ps/public/lp/contents/Brochures/web/MaxFire.pdf.

(56) References Cited

OTHER PUBLICATIONS

Halliburton, Releasable Cable Heads, 1 pg., Mar. 23, 2018, https://www.halliburton.com/en-US/ps/wireline-perforating/wireline-and-perforating/deployment-risk-avoidance/releasable-wireline-cable-head-rwch-tool.html.
Halliburton, Releasable Wireline Cable Head (RWCH Tool), 2016, 2 pgs., https://www.halliburton.com/content/dam/ps/public/lp/contents/Data_Sheets/web/H/Releasable-Wireline-Cable-Head-Tool-RWCH.pdf.
Halliburton, RexConnect—Have a dialogue with your reserviour, 2015, 8 pgs., https://www.halliburton.com/content/dam/ps/public/ts/contents/Brochures/web/RezConnectBrochure.pdf.
Halliburton; Wireline and Perforating Advances in Perforating; dated Nov. 2012; 12 pages.
Harrison Jet Gun Xtra Penetrator, website visited Nov. 29. 2018, 1 pg., https://www.google.com/search?q=harrison+jet+gun+xtra+penetrator&client=firefox-b-1-d&source=lnms&tbm=isch&sa=X&ved=0ahUKEwjY0KOQ1YTjAhXHmeAKHa00DeYQ_AUIESgC&biw=1440&bih=721#imgrc=ZlqpUcJ_-TL3IM.
Horizontal Wireline Services, Presentation of a completion method of shale demonstrated through an example of Marcellus Shale, Pennsylvania, USA, Presented at 2012 International Perforating Symposium (Apr. 26-28, 2012), 17 pages.
Hunting Energy Service,ControlFire RF Safe ControlFire® RF-Safe Manual, 33 pgs., Jul. 2016, http://www.hunting-intl.com/media/2667160/ControlFire%20RF_Assembly%20Gun%20Loading_Manual.pdf.
Hunting Titan Inc.; Petition for Post Grant Review of U.S. Pat. No. 10,429,161; dated Jun. 30, 2020; 109 pages.
Hunting Titan, Wireline Top Fire Detonator Systems, Nov. 24, 2014, 2 pgs, http://www.hunting-intl.com/titan/perforating-guns-and-setting-tools/wireline-top-fire-detonator-systems.
International Searchiing Authority, International Search Report and Written Opinion of International App. No. PCT/EP2019/063966, dated Aug. 30, 2019, 10 pages.
International Searching Authority, International Search Report and Written Opinion for PCT App. No. PCT/IB2019/000526; dated Sep. 25, 2019, 17 pgs.
International Searching Authority, International Search Report and Written Opinion for PCT App. No. PCT/IB2019/000530; dated Oct. 8, 2019; 13 pgs.
International Searching Authority, The International Search Report and Written Opinion of International App. No. PCT/IB2019/000537, dated Sep. 25, 2019, 18 pgs.
International Searching Authority; Communication Relating to the Results of the Partial International Search for PCT/EP2020/070291; dated Oct. 20, 2020; 8 pages.
International Searching Authority; International Preliminary Report on Patentability for International Application No. PCT/IB2019/000537; dated Dec. 10, 2020; 11 pages.
International Searching Authority; International Preliminary Report on Patentability for International Application No. PCT/IB2019/000526; dated Dec. 10, 2020; 10 pages.
International Searching Authority; International Preliminary Report on Patentability for PCT/ EP2019/066919; dated Jan. 7, 2021; 9 pages.
International Searching Authority; International Preliminary Report on Patentability for PCT/ B2019/000530; dated Jan. 7, 2021; 9 pages.
International Searching Authority; International Preliminary Report on Patentability International Application No. PCT/EP2019/063966; dated Dec. 10, 2020; 7 pages.
International Searching Authority; International Preliminary Report on Patentability of the International Searching Authority for PCT/EP2019/072064; dated Feb. 25, 2021; 9 pages.
International Searching Authority; International Preliminary Report on Patentability of the International Searching Authority for PCT/EP2019/072032; dated Mar. 4, 2021; 9 pages.
International Searching Authority; International Search Report and Written Opinion for PCT App. No. PCT/EP2019/066919; dated Sep. 10, 2019; 11 pages.
International Searching Authority; International Search Report and Written Opinion for PCT App. No. PCT/EP2019/072032; dated Nov. 15, 2019; 13 pages.
International Searching Authority; International Search Report and Written Opinion for PCT App. No. PCT/EP2019/072064; dated Nov. 20, 2019; 15 pages.
International Searching Authority; International Search Report and Written Opinion of the International Searching Authority for PCT/EP2020/075788; dated Mar. 16, 2021; 17 pages.
International Searching Authority; International Search Report and Written Opinion of the International Searching Authority for PCT/EP2020/070291; dated Dec. 15, 2020; 14 pages.
International Searching Authority; Invitation to Pay Additional Fees with Partial International Search for Application No. PCT/EP2020/075788; dated Jan. 19, 2021; 9 pages.
Jet Research Center Inc., JRC Catalog, 2008, 36 pgs., https://www.jetresearch.com/content/dam/jrc/Documents/Books_Catalogs/06_Dets.pdf.
Jet Research Center Inc., Red RF Safe Detonators Brochure, 2008, 2 pages, www.jetresearch.com.
Merol Applied Intelligence, Matrix Roxar Metrol Wireless Interface, 1 pg., https://www.metrol.co.uk/assets/docs/datasheets/MET-MATRIX-V01.pdf.
Micro Smart Systems, Slickline Triggers & Perforators, 1 pg., https://www.micro-smart.com/pdf/slickline_trigger_overview.pdf.
Owen Oil Tools & Pacific Scientific; RF-Safe Green Det, Side Block for Side Initiation, Jul. 26, 2017, 2 pgs.

\* cited by examiner

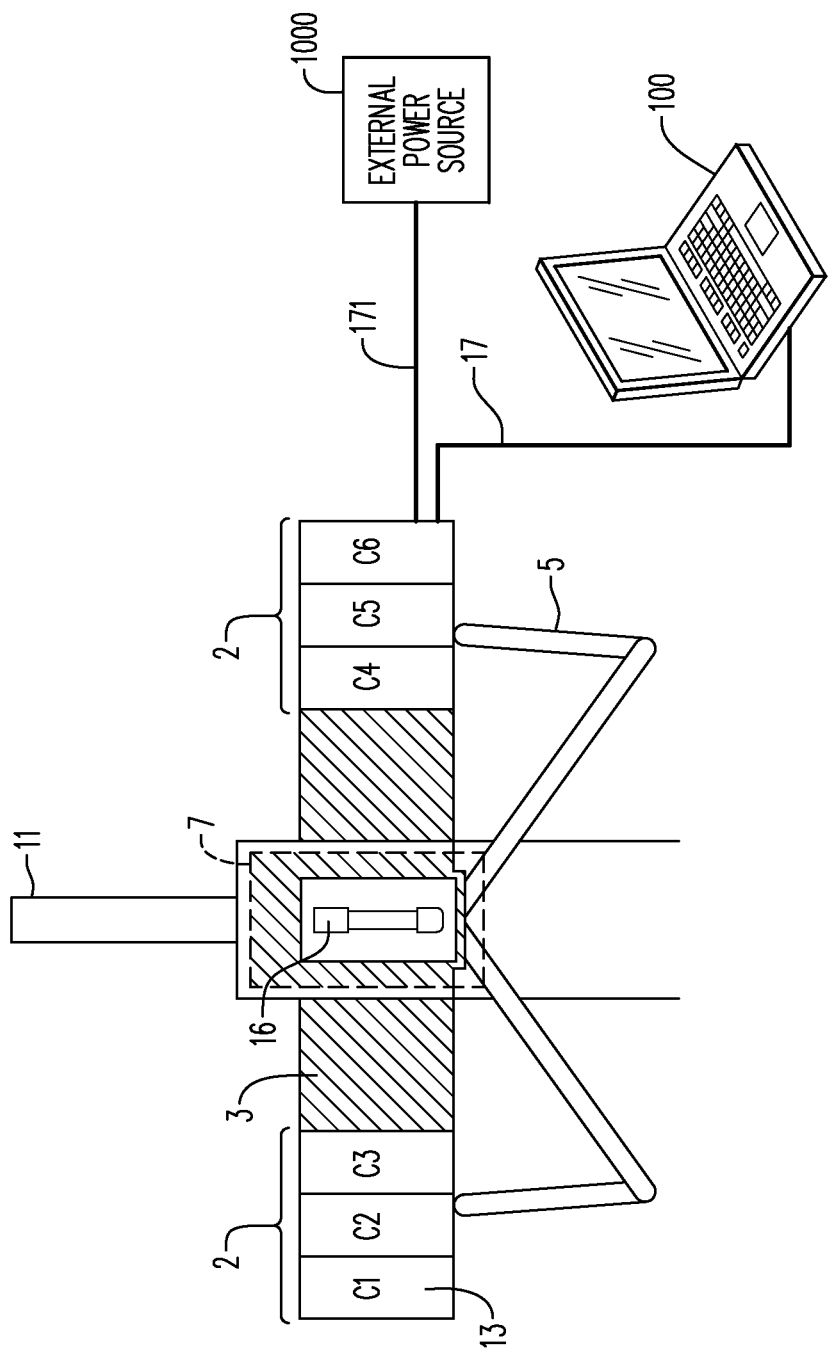

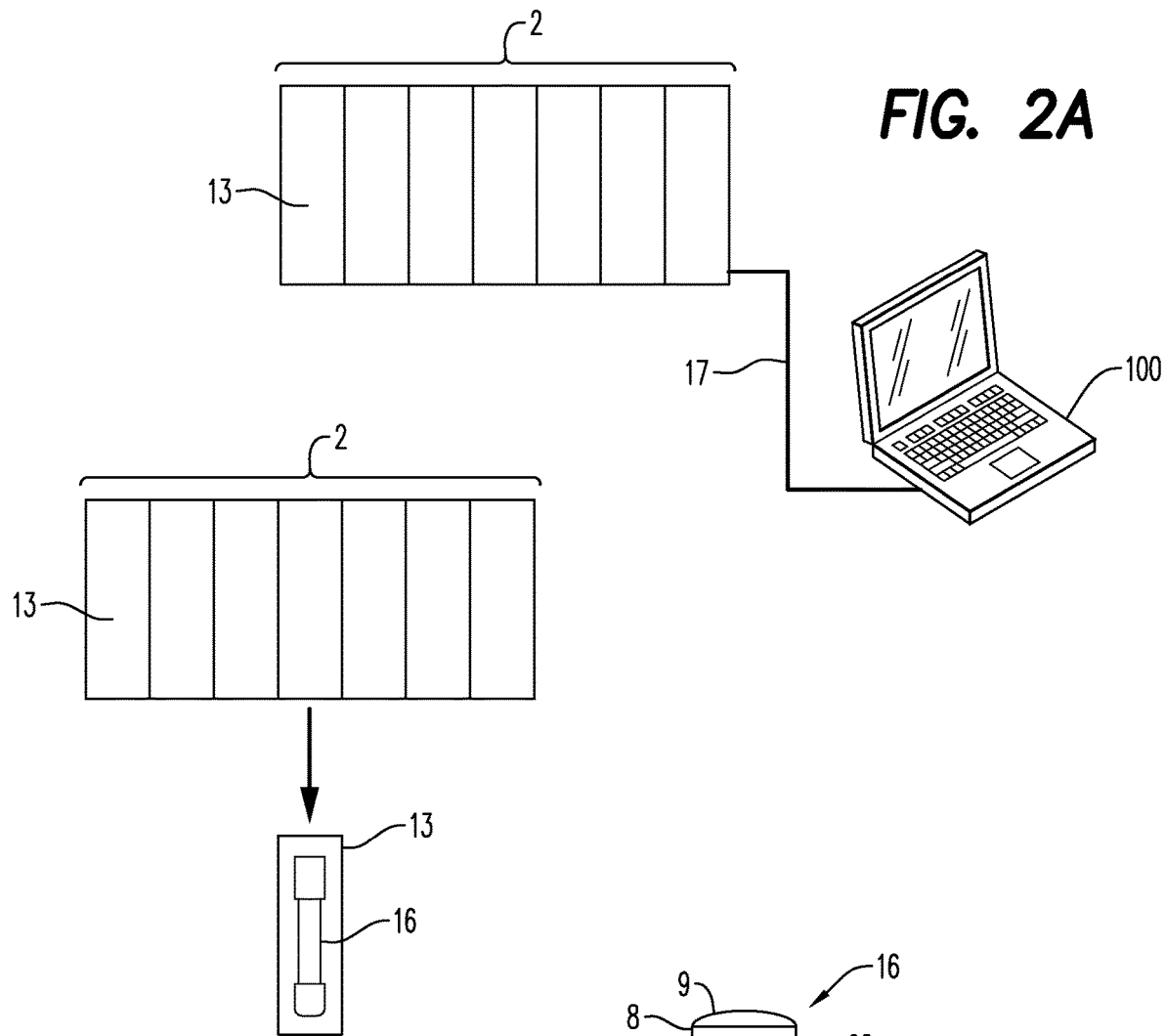
FIG. 2A
FIG. 2B
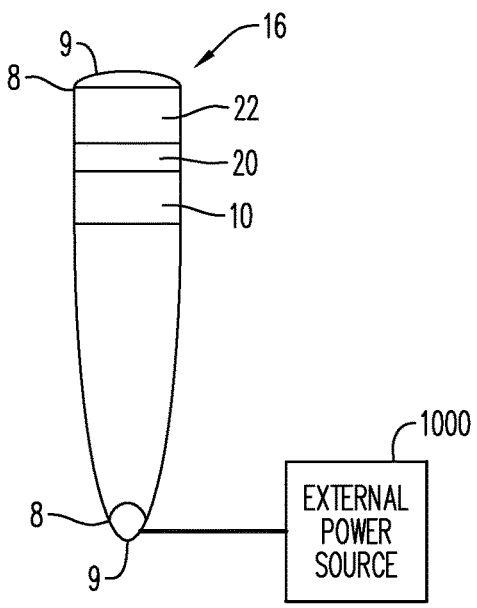
FIG. 3

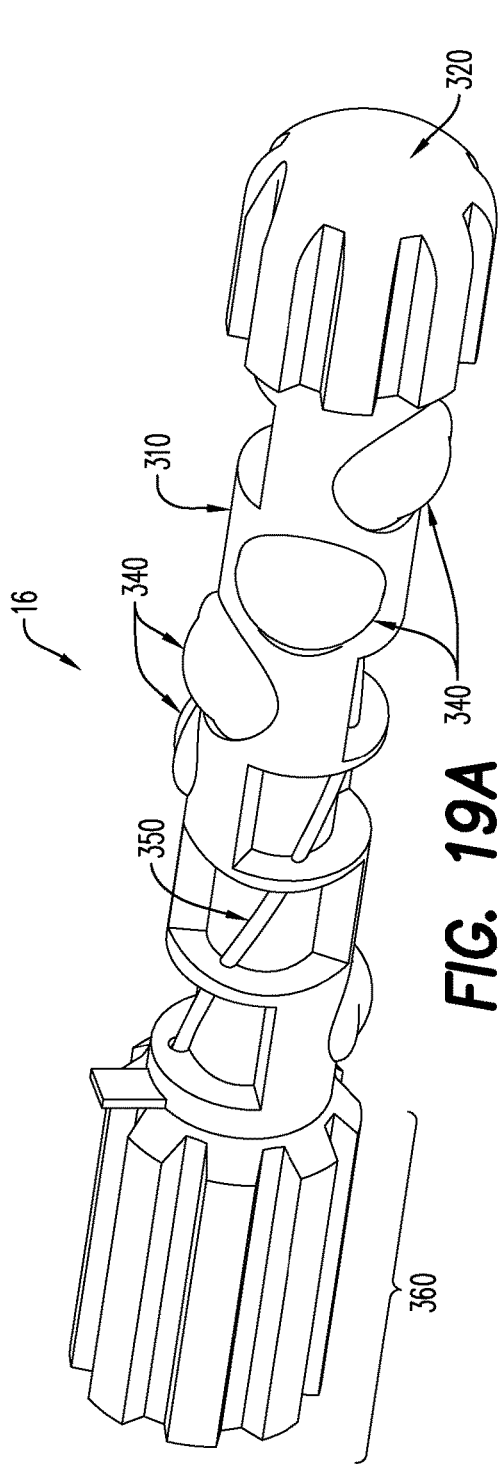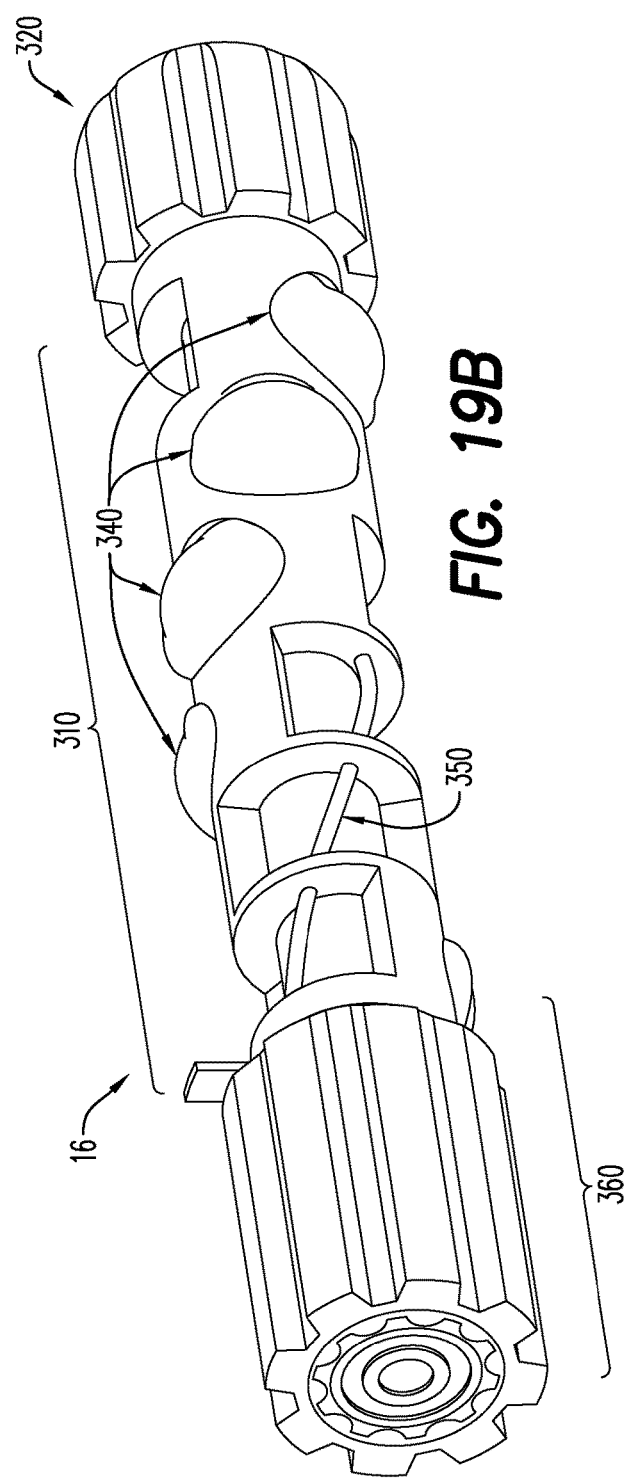

SYSTEM AND METHOD TO DEPLOY AND CONTROL AUTONOMOUS DEVICES

CROSS-REFERENCE TO RELATED APPLICATIONS

This application is a national stage entry of International Application No. PCT/EP2019/072055, filed Aug. 16, 2019, which claims the benefit of U.S. Provisional Patent Application No. 62/719,816, filed Aug. 20, 2018, the entire contents of which is incorporated herein by reference.

BACKGROUND OF THE DISCLOSURE

Current systems used in well perforation require a manual control and deployment of wellbore tools. Current wellbore tools are physically connected to a control system via a cable. Most of the tools are assembled on site and conveyed into a wellbore. For example, each wellbore tool is manually placed into the well and manually controlled.

The introduction of a drone which contains such wellbore tools or functions thereof changes this picture significantly. However, it is not easy to provide a real time control over drones deployed into a wellbore to direct or track what the drone is doing within the wellbore. Thus, control systems for controlling, deploying, directing, testing, and tracking all drones or tools within the wellbore have been developed, however many of existing systems are designed based on tethered (wired) control mechanisms, and thus limiting mobility or accessibility of drones within the wellbore.

Thus, there is a need for an untethered control system and method for autonomous drones traveling down a wellbore to provide more efficient and flexible control environments.

BRIEF DESCRIPTION OF THE EXEMPLARY EMBODIMENTS

Embodiments of the present disclosure provide a more efficient control system or method for deploying and controlling autonomous drones into a wellbore. In addition, the control system or method in accordance with the present disclosure provide solutions for controlling, testing, directing and monitoring operations of the drones or other peripheral devices/components that help the deployments of the drones, such as a magazine, a launcher, a lubricator unit, a lift, or the like.

According to an aspect, the control system 100 in accordance with the present disclosure is configured to control operations of drones before and after their deployment into a wellbore for performing various actions within the wellbore, such as positioning, deploying, activating, detonating, fracturing, perforating operations, or the like, or other supporting devices or components such as a magazine or a launcher, and/or monitor status thereof.

For example, the control system may perform actions including, but not limited to identifying and controlling the magazine and magazine contents (e.g., drones), controlling the launcher and a lubricator unit, and the deployment of the drones 16 into the wellbore. The control system may further be configured to assign set and reset information (e.g., status, location/depth assignment, simulated location tracking in real time, etc.) required by the magazine and the magazine contents, and display active transmit status of markers within a wellbore (e.g., beacons, magnets, chemical traces, casing collar locators (CCLs), sensors for sensing vibration, acoustic signals or any properties that indicate an explosion or perforation has occurred) using theoretical figures showing CCLs within the wellbore. According to an aspect, the control system performs a variety of tests of the devices or the drones mentioned above.

The control system may include one or more control interfaces for performing the above control actions. The control interfaces may include a hardware control interface, a software control interface, and/or combination thereof configured to generate, provide and exchange control signals or information between the control system and any of devices/components such as drones, magazines, a launcher, a lift, a lubricator, etc., disclosed in the present disclosure.

BRIEF DESCRIPTION OF THE DRAWINGS

A more particular description will be rendered by reference to specific embodiments thereof that are illustrated in the appended drawings. Understanding that these drawings depict only typical embodiments thereof and are not therefore to be considered to be limiting of its scope, exemplary embodiments will be described and explained with additional specificity and detail through the use of the accompanying drawings in which:

FIG. 1 is a side view of an overall wellbore drone deployment system according to an exemplary embodiment of the present disclosure;

FIG. 2A is a side view of a magazine of FIG. 1 illustrating an external connection to a control system according to an exemplary embodiment of the present disclosure;

FIG. 2B is a side view of a magazine, a magazine chamber, and a drone of FIG. 1 illustrating the drone being dispensed from the magazine chamber according to an exemplary embodiment of the present disclosure;

FIG. 3 is a perspective view of a drone according to an exemplary embodiment of the present disclosure;

FIG. 19A is a perspective view of a drone in the form of a perforating gun;

FIG. 19B is different perspective view of the drone of FIG. 19A; and

Figure 4A:
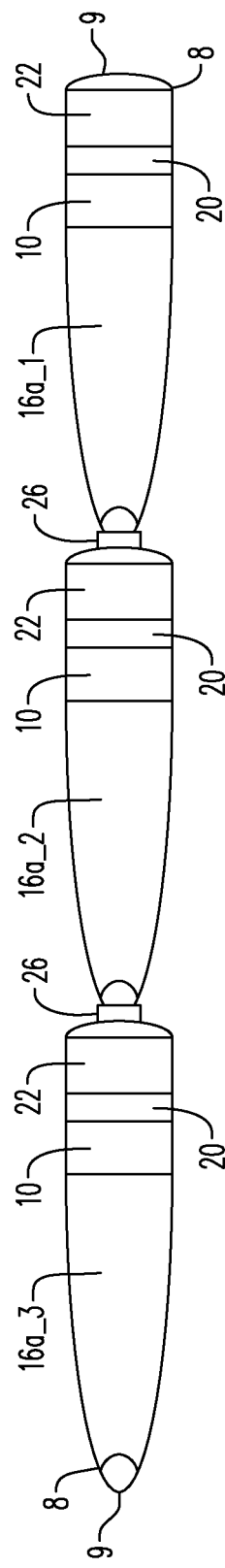
FIG. 4A is a perspective view of a string of drones each with a single battery according to an exemplary embodiment of the present disclosure.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to limit the scope of the description or the claims. To facilitate understanding, reference numerals have been used, where possible, to designate like elements common to the figures.

DETAILED DESCRIPTION

Reference will now be made in detail to various embodiments. Each example is provided by way of explanation and is not meant as a limitation and does not constitute a definition of all possible embodiments.

For this disclosure, the term "drone" and "wellbore drone" are interchangeable. The drone (or the wellbore drone) may refer to a device configured for use in a wellbore to have various functions and tasks of (wellbore) tools such as a perforating gun, a plug/frac plug, an explosive jet cutter, or any other ballistic device or tools; or in another aspect, the drone itself may refer to any one of the (wellbore) tools.

Further, the term "magazine content(s)", "magazine chamber content(s)", and/or the like may refer to drone(s) or tool(s) stored in the magazine.

This application incorporates by reference each of the following pending patent applications in their entireties: U.S. patent application Ser. No. 16/537,720, filed Aug. 12, 2019; U.S. application Ser. No. 16/451,440, filed Jun. 25, 2019; International Patent Application No. PCT/EP2019/066919, filed Jun. 25, 2019; International Patent Application No. PCT/US2019/063966, filed May 29, 2019; U.S. patent application Ser. No. 16/423,230, filed May 28, 2019; U.S. Provisional Patent Application No. 62/842,329, filed May 2, 2019; U.S. Provisional Patent Application No. 62/841,382, filed May 1, 2019; International Patent Application No. PCT/M2019/000526, filed Apr. 12, 2019; U.S. Provisional Patent Application No. 62/831,215, filed Apr. 9, 2019; International Patent Application No. PCT/M2019/000530, filed Mar. 29, 2019; U.S. Provisional Patent Application No. 62/823,737, filed Mar. 26, 2019; International Patent Application No. PCT/M2019/000537, filed Mar. 18, 2019; U.S. Provisional Patent Application No. 62/816,649, filed Mar. 11, 2019; U.S. Provisional Patent Application No. 62/720,638, filed Aug. 21, 2018; U.S. Provisional Patent Application No. 62/765,185, filed Aug. 16, 2018; U.S. Provisional Patent Application No. 62/690,314, filed Jun. 26, 2018; U.S. Provisional Patent Application No. 62/678,654, filed May 31, 2018; and U.S. Provisional Patent Application No. 62/678,636, filed May 31, 2018.

For purposes of illustrating features of the embodiments, embodiments of the disclosure will now be introduced in reference to the figures. Those skilled in the art will recognize that this example is illustrative and not limiting and is provided purely for explanatory purposes.

Referring now to FIG. 1, the magazine 2 includes a body having a plurality of magazine chambers 13, as exemplary illustrated in FIG. 1. Each drone 16 is at least temporarily retained in one of the magazine chambers 13 and is dispensed from its respective magazine chamber 13 to a system external to the magazine 2 in a selected order. In one aspect, the magazine 2 may include at least one transceiver (not shown) for communicating with the drones 16. The transceiver may communicate with the drone 16 while the drone is retained in the magazine chamber 13, and after the drone 16 has been dispensed from the magazine 2. According to an aspect, the drones 16 may be dispensed from the magazine 2 using an automated/preselected process.

Referring further to FIG. 1, the launcher 3 is configured to receive a plurality of drones 16 and dispense the drones 16 into an oil or gas wellbore. The launcher 3 may include a caisson/lubricator 7, and a magazine 2 including the plurality of drones 16. The magazine 2 and the drones 16 are configured substantially as described hereinabove. According to an aspect, the magazine 2 is coupled or otherwise secured to the caisson 7. Each of the magazine chambers 13 is configured for at least temporarily retaining and dispensing the drones 16 to the caisson 7 in a selected or pre-selected order. The launcher 3 further includes a driving member/trigger in operative communication with the caisson 7. The driving member is configured to move the drones when the drone 16 is contained within the caisson 7. According to an aspect, the launcher 3 includes a release mechanism coupled to the caisson 7 and configured for opening a port/fluid connection port in the caisson 7. The driving member and release mechanism work together to deploy the drones 16 into the wellbore. According to an aspect, the driving member moves the drone out of the caisson 7 when the release mechanism forms the port, which facilitates the release of the drone from the caisson 7 and the deployment of the drone into the wellbore. Lift assembly 5 is described hereinbelow.

The U.S. Provisional Application No. 62/678,654, filed May 31, 2018, describes more details of configurations and operations of the magazine 2, the launcher 3, and/or other devices coupled thereto, the entire disclosure of which is incorporated by reference herein in its entirety to the extent that it is consistent with this disclosure.

According to an aspect, the drones 16 are tested prior to being mounted into the magazine 2, and thus, prior to deployment into a wellbore. The drones 16 may be tested after they have been mounted into the magazine 2. To this end, the magazine 2 can be connected to an external power source 1000 via a wired or wireless connection and trigger a self-test for itself and every chamber 13 and its contents (e.g., drones). Unique IDs (e.g., C1-C6), which may be any combination of numbers and/or letters, are assigned to the chambers 13, respectively. The magazine 2 itself will have indicators such as digital numbers, color LEDs, and/or any other component approximate thereto to reflect an issue with any of its chambers, respective drones 16 retained in the chambers 13, and/or the magazine 2. The indicators may be colored to show statuses of the contents or self-test results thereof (e.g., red for "fail", green for "pass"). A piston 11 interacting with the caisson 7 will be described hereinbelow.

Referring back to FIG. 1, the control system 100 is configured to communicate with the magazine 2 via a wire or wireless connection 17 for controlling one or more operations of the magazine 2. The control system 100 may provide detailed information including the contents of the magazine 2, self-test results, and may track and set a sequence of the magazine contents deployments.

As illustrated in FIGS. 1 and 2, through an external connection 17 between the magazine chamber 13 and the control system 100, the control system 100 can initiate the self-test of an individual drone 16, all drones at once, or interrogate a specific drone/magazine chamber 13. Connections including the external connection 17 can be direct (plug in) or wireless (e.g., Bluetooth) to some type of servers including onsite, offsite and cloud based servers. Alternatively, the self-test can be auto activated via a mechanical device or upon connecting the magazine 2 or drone 16 to an external power source 1000. Power source 1000 may be connected to the magazine 2 or directly to drone 16 via connection 171.

For example, when the control system 100 performs a certain control action for a device such as a drone, a magazine, a launcher, or the like, it may be understood that one or more control interfaces of the control system 100 perform the control action.

Figure 9:
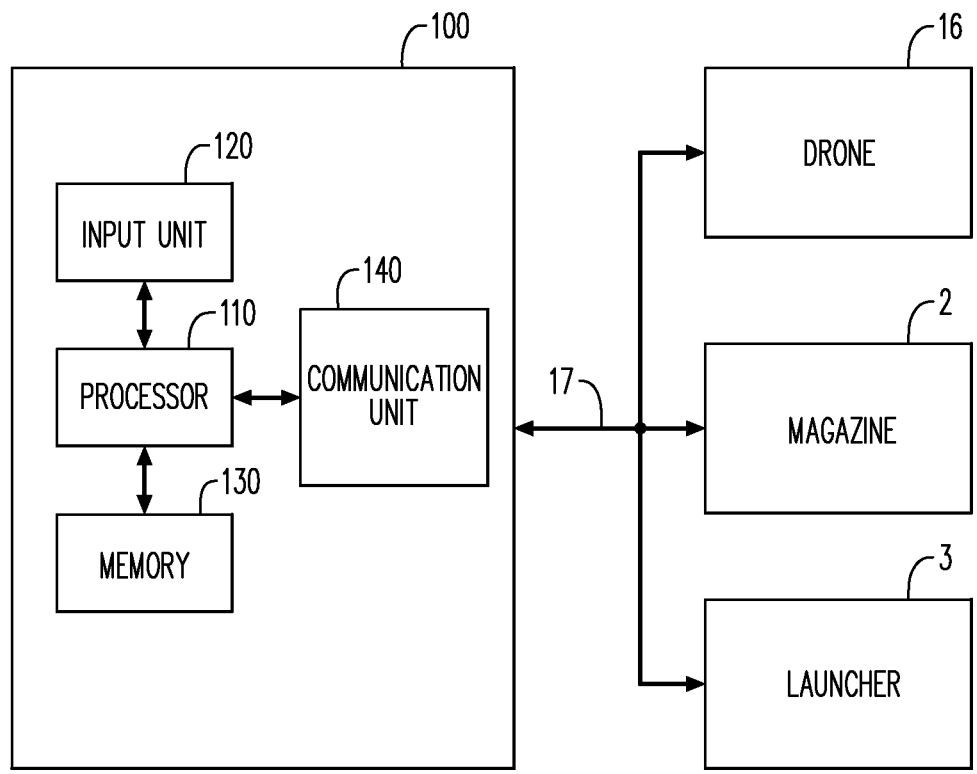
FIG. 9 is a block diagram of a wellbore system illustrating a control mechanism for a drone, a magazine and a launcher according to an exemplary embodiment of the present disclosure.

Referring now to FIG. 9, the control system 100 may include one or more processors 110, a memory 130 coupled to the one or more processors 110, an input unit 120 for providing a user interface for a manual command by the user or control commands by other offsite or onsite servers, and a communication unit 140 for communicating with other devices or components such as the magazine 2, the launcher 3, drones 16, or the like. A wired or wireless connection 17 may be present between the control system 100 and the magazine 2, launcher 3 and/or the drones 16. The memory 130 may include program instructions executable by the one or more processors 110.

In one embodiment, the control system 100 is configured for controlling the magazine unit 2 to: initiate a self-test on the magazine 2 or chamber contents thereof; identify and flag a failed self-test of a drone; lock a chamber based on the self-test results of a drone (e.g., fail=locked); assign a location for the delivery of the magazine contents; identify and visualize magazine chamber contents and their pre-determined location, show detailed magazine information, unique ID, and self-test results.

The control system 100 is configured for controlling the magazine unit 2 to report a result of the self-test to the control system 100 upon the self-test being completed.

The self-test on the magazine unit 2 may include testing functionality or status of the drone 16; testing functionality or status of an on-board control system 10; testing current software (S/W) version; testing the magazine units integrity on the on-board control system 10; testing functionality or status of a wellbore tool (e.g., perforating gun, plug, detonator, jet cutter, etc.) of the drone 16; and testing functionality or status of an internal power source 20 (e.g., battery) of the drone 16.

The self-test on the magazine unit 2 may further include: testing whether a pre-determined location is assigned to a drone within a magazine chamber 13; whether a tool (or a drone) has been identified by the control system (for wellbore tracking purposes); and whether a magazine chamber chain is functioning properly.

In one embodiment, the control system 100 is configured for controlling the magazine unit 2 to perform a self-test on the drone 16, a combination of the one or more chambers 13 and the drone 16, or all the chambers 13 and the drone 16 at once.

In one embodiment, the control system 100 is aware of the self-test results and dictates if the tool (or drone) moves forward into a lubricator 7 and down the wellbore. If the tool or contents of the magazine chamber 13 fail the self-test, the magazine chamber 13 containing the tool will not open to the lubricator 7 and will be flagged as inoperable/unusable and will remain inaccessible until it can pass a self-test. The chamber 13 will be locked through an electrical connection/device to prevent the loading, exposure, or unloading of a failed drone into the wellbore. A passed self-test will result in the deployment of the tool (or drone) from the magazine chamber 13 into the lubricator 7 and down the wellbore.

For example, for a first drone and a second drone (not shown) out of a plurality of drones 16 each mounted in the chambers 13, the control system 100 may determine the first drone as a pass drone upon the first drone passing the self-test on the functionality or status thereof; and determine the second drone as a fail drone upon the second drone failing the self-test on the functionality or status of the second drone. The control system 100 controls the magazine 2 to: dispense the first drone (e.g., passed drone) for being deployed into the wellbore; and hold the second drone (e.g., failed drone) to prevent the second drone from being dispensed into the wellbore until the second drone passes another self-test to be initiated by the control system 100. The control system 100 further controls the magazine 2 to lock a door of a chamber 13 where the second drone is located, to hold the second drone.

A single magazine 2 is designed for a plurality of drones 16. The drones will be held (or stored) in their respective magazine chambers 13 within the magazine 2 as depicted in FIG. 1. Each chamber 13 and drone 16 will have a unique ID that can be identified and used by the control system 100. The drone ID will identify the type and the unique ID of this specific drone.

In one embodiment, the control system 100 may be configured to assign, set, and reset information (e.g., status of each chamber or drone, a location assignment, a simulated location tracking in real time, etc.) required by the magazine unit 2 and the drone 16 placed in the corresponding chamber 13 of the magazine unit 2.

In addition, in one embodiment, prior to the deployment of the drone 16, the control system 100 may receive magazine information including, but are not limited to: a unique ID 15 or a type of the drone 16 corresponding to a chamber 13; a deployment sequence assigned for the drone 16; an assigned location to the drone 16 within the wellbore; and self-test results on individual components of the magazine unit 2. The received magazine information can be displayed in a 2D or 3D mode using one or more control interfaces of the control system 100.

Referring back to FIG. 1, the launcher 3 may include a lift (assembly) 5 that is secured to a plurality of the magazines 2, may move or transport the magazines 2. The U.S. Provisional Application No. 62/678,654, filed May 31, 2018, describes more details of configurations and operations of the lift assembly, the entire disclosure of which is incorporated by reference herein in its entirety to the extent that it is consistent with this disclosure.

In addition, the launcher 3 also incorporates the programming and user interface of the control system 100 or manual PLC control unit for deployment of drones down a wellbore, tasks associated with preparing the magazine 2 and the magazine chamber 13, and any self-test processes that must occur for drone deployment. Self-test processes of the launcher 3 may include testing the functionality of connection units, lock doors, transfer mechanism of a drone from the magazine 2 to the lubricator unit 7, pressure equalization, and a piston or other electromechanical devices.

The control system 100 controls the launcher 3 to open or close connection units and lock doors between the magazine chamber 13 and a lubricator 7. When a drone is ready, the control system 100 initiates the transfer of the drone 16 from the magazine chamber 13 into the lubricator 7. Once the drone 16 is in its designated position in the lubricator 7, the control system 100 confirms that the lock doors have closed and pressure-sealed. Further, the control system 100 pressurizes the lubricator 7 to match the wellbore pressure and initiates the kicking of the drone 16 into the wellbore via an electromechanical device such as a piston 11.

Turning now to embodiments of a control mechanism for drones 16, the control system 100 can provide detail information including setting a sequence of events/drone deployments, track drones inside a wellbore, show information regarding drone contents, ID and self-test results; determine or track detonation of a drone; and show the active markers (e.g., beacons, magnets, chemical traces, CCLs, vibration or acoustic sensors, etc.). The control system 100 may be configured to simulate the location of a drone or display a drone using a corresponding unique ID.

Prior to deployment of the drone 16 into the wellbore (e.g., during the pre-deployment phase), the control system 100 has capabilities of: initiating self-test of a drone; identifying and flagging a failed self-test; flagging failed-self test drones as unusable/inoperable; assigning a location for the delivery of a drone; testing the status and functionality of all drone components including an on-board control system 10 (or processors), active wellbore markers (see 14 of FIG. 8) (e.g., beacons, magnets, CCLs, etc.) and positioning/orienting devices (e.g., gyroscope, pressure sensors, active oscillator-circuit casing collar locator, etc.) embedded in the drone; tracking the depth/location of a drone in a wellbore; assigning a sequence of drones to be deployed down a well; and showing detailed drone information such as unique ID, magazine chamber location, and self-test results. The on-board control system 10 of a drone is further configured to report current status thereof to the magazine 2 that houses a plurality of drones 16.

In one embodiment, the drone 16 may include a machine learning system (not shown) implemented based on at least one algorithm of an artificial neural network (ANN), recurrent neural network (RNN) including long short-term memory (LSTM) (i.e., a LSTM network), a support vector machine, a decision tree, a deep learning, a sparse network of winnows (SNoW), a K-nearest neighbor, a Naïve Bayes, or the like, or any combination thereof.

As discussed above, various self-test analysis on the magazine 2, the launcher 3, the drones 16, and any other devices supporting the deployment of the drones are performed prior to deployment.

For example, the self-test analysis can be electronically initiated in the magazine chamber 13. Status measurements of the internal power source 20 within the drone module or plug module will be assessed during the self-test analysis. The self-test analysis will ensure all markers such as beacons and/or permanent magnets are active and therefore can be recognized by a drone traveling down a wellbore. The self-test results will be assessable by the control system 100 and an operator.

After the interrogation/self-testing of the magazine 2, the drone 16, and the launcher 3, the drone 16 will be pushed from the lubricator 7 into the wellbore. Due to high pressure and the fluid flow path, as depicted in FIG. 1, a piston 11 or other electromechanical device/(s) will be used to push the drone into the wellbore. According to an aspect, the control system 100 actuates the piston 11 or electromechanical devices. The control system 100 may be responsible for the opening and closing of various safety valves/release mechanisms 1 that enable deployment of the drone 16 into the wellbore. Such release mechanisms are described in U.S. Provisional Application No. 62/678,654, filed May 31, 2018, and the entire disclosure of which is incorporated by reference herein.

Figure 10:
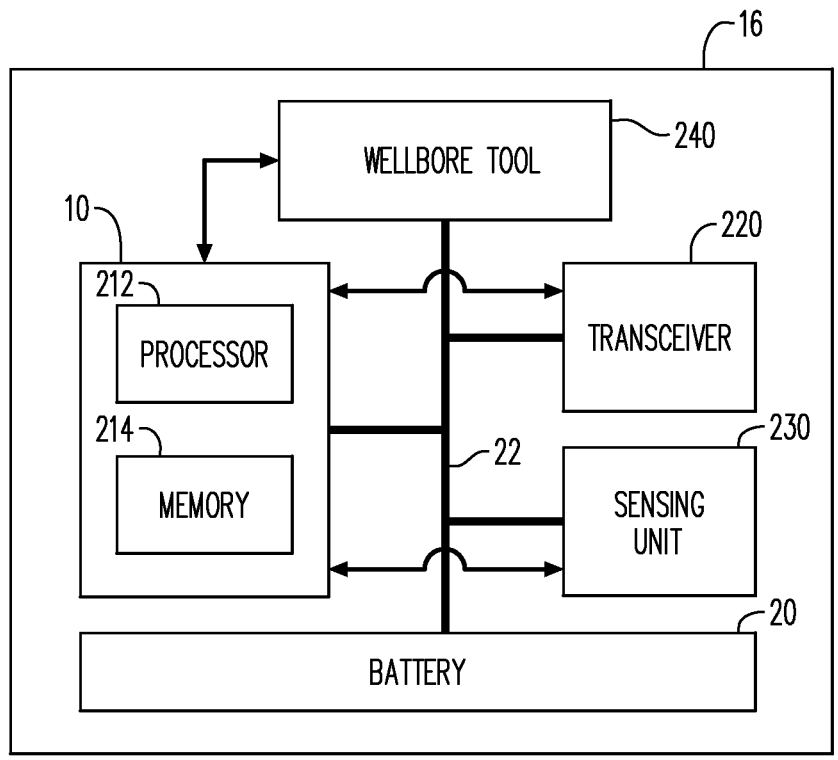
FIG. 10 is a block diagram of the drone of FIG. 9 according to an exemplary embodiment of the present disclosure.

In one embodiment, referring now to FIGS. 3 and 10, an on-board control system 10 can be internally embedded to the drone 16 for controlling over the drone 16 as it travels in a wellbore. As illustrated in FIG. 3, the drone 16 will contain the on-board control system 10, a trigger circuit 22, an internal power source 20 (e.g., battery). For example, the trigger circuit 22 is separate from the on-board control system 10 and is not connected to the internal power source, and the internal power source 20 gets connected to the trigger circuit 22 based on the on-board control system control and can be initiated (or activated) based on a time, pressure, temperature, and/or a mechanical initiation.

In one embodiment, the on-board control system 10 may report to the holding chamber 13 its currents, possibly continuously, while being powered by the external power source 1000.

The on-board control system 10 includes one or more control interfaces for providing control commands to control the drone 16. A wellbore tool of the drone is configured to perform one or more actions within a wellbore based on the control commands provided from the on-board control system 10. The one or more actions include, but are not limited to: positioning, deploying, activating, and detonating a wellbore tool. To this end, the on-board control system 10 may include one or more processors 212 configured to provide the control commands to the wellbore tool 240, a memory 214 coupled to the one or more processors 212, and CCL's, gyroscope, sensors, an initiation module, etc.

In one embodiment, the control commands are loaded into the memory 214, prior to the drone 16 being deployed into the wellbore. In another embodiment, the control commands are generated by the one or more processors 212 at least based on one or more indications received from one or more markers (e.g., beacons, magnets, chemical traces, CCLs, vibration or acoustic sensors, etc.) placed in the wellbore through a communication unit 220 disposed in the drone 16.

A wellbore tool 240 of the drone 16 is configured to perform at least one action within the wellbore based on the control commands provided from the on-board control system 10.

While the drone 16 is outside of the wellbore (e.g., prior to the deployment of the drone), the drone 16 is connected to the external power source 1000 via a wired or wireless connection 171 and is not engaged to the internal power source 20 (e.g., battery). However, this connection 171 may be used to verify the status and the functionality of the internal power source 20. The connection points 8, 9 can be at the front or rear end of the drone 16 which allow a variety of tests prior to deployment, but will not allow for drone initiation.

In one embodiment, prior to deployment of the drone into the wellbore, status of the internal power source 20 is tested while the internal power source 20 is inactivated. For example, the power level of the internal power source 20 is measured and reported to the control system 100 while the internal power source 20 is inactivated (or not engaged).

The internal power source 20 may be connected to the wellbore tool 240 and the on-board control system 10. However, in some aspects, prior to deployment of the drone, the internal power source 20 is inactive (or not engaged) to the wellbore tool but active (or engaged) to the on-board control system 10 and becomes active (engaged) upon the deployment of the drone into the wellbore and occurrence of one or more power trigger events which are associated with a specific depth (or location) of the drone within the wellbore, a temperature or pressure around the drone within the wellbore, mechanical or chemical initiation conditions, or the like. In other aspects, prior to deployment of the drone, the internal power source 20 is inactive to both the wellbore tool 240 and the on-board control system 10 and becomes active upon the deployment of the drone into the wellbore and the occurrence of one or more power trigger events. If the internal power source 20 is not active, there is no power to the wellbore tool 240 and/or the on-board control system 10.

In one embodiment, the one or more power trigger events include, but are not limited to: matching of a location of the drone 16 to a predetermined location within a wellbore; matching of a temperature inside/outside the drone 16 to a predetermined temperature; and matching of a pressure inside/outside the drone 16 to a predetermined pressure. In addition, the one or more power trigger events include, but are not limited to: receiving a mechanical force or an electromagnetic force provided from one or more markers 14 placed within the wellbore, so that the mechanical force or the electromagnetic force activates the internal power source 20 or a power connection 22 output from the internal power source 20.

In one aspect, the location of the drone 16 may be determined, by at least one of an external control system 100 and the on-board control system 10, based on a flow speed of frac fluid along which the drone 16 travels within the wellbore and a time passed after the drone 16 is dispensed for being deployed into the wellbore. For example, the flow of the frac fluid may be monitored and changed by the control system 100. Regardless of the ability to change the flow, the control system 100 (or the on-board control system 10) may receive flow information to monitor average (inaccurate) progress of the moving drone. By determining the amount of time passed and the speed of the fluid at every moment, the control system 100 (or the on-board control system 10) can calculate and determine the location of a moving drone within the wellbore. The location of the drone 16 can be approximated as the amount of friction when traveling in the wellbore is unknown and likely negligible.

In another aspect, the location of the drone 16 may be determined based on one or more location indications received from one or more location markers 14 placed within the wellbore using a communication unit 220 of the drone 16. The one or more location markers 14 may include, but are not limited to: beacons, magnets, chemical traces, and/or CCL's, or the like, more details of which are described in U.S. Provisional Application No. 62/678,636, filed May 31, 2018, and the entire disclosure of which is incorporated by reference herein in its entirety to the extent that it is consistent with this disclosure.

In one embodiment, the drone 16 includes one or more sensors 230 (e.g., a temperature sensor, a pressure sensor, a position sensor, an orienting sensor, and an active oscillator-circuit casing collar locator) configured to measure a temperature or pressure inside/outside the drone and send the measured temperature or pressure to the on-board control system 10 of the drone 16 using the communication unit 220. The on-board control system 10 may compare the received temperature or pressure to respective predetermined temperature or pressure to determine if a power trigger event occurs. In some aspects, the sensors 230 are operable without power.

In one embodiment, the temperature or the pressure inside/outside the drone 16 may be determined based on one or more temperature or pressure indications received from one or more temperature markers or pressure markers placed within the wellbore using the communication unit 220 of the drone 16.

In addition to tracking the location of the moving drone 16, various sensors (not shown) other than the location markers 14 may be placed at a wellhead of the wellbore to detect vibrations indicating a perforation or explosion has occurred. The sensors may sense vibration, acoustic signals, or any other properties that may indicate an explosion has occurred. By determining the detonation status, an operator can determine if the drone 16 has perforated the well casing and initiate the next step in the fracturing process. To this end, the control interface of the control system 100 may be configured to allow the operator to monitor and track a (real-time) location of the drone 16 and active explosions or perforations to determine, e.g., whether perforations have been made.

Figure 5:
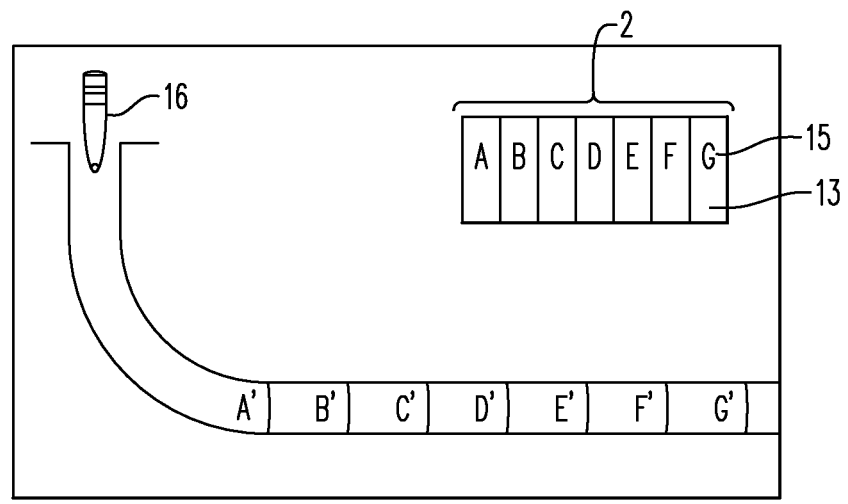
FIG. 5 is a conceptional diagram of a wellbore illustrated in conjunction with a magazine chamber for explaining a tool assignment interface according to an exemplary embodiment of the present disclosure.

As previously discussed, each drone 16 has its unique ID 15 within a magazine chamber 13 that can be addressed by the control system 100 as depicted in FIG. 5. This capability may allow the control system 100 to determine what drone will be deployed down the wellbore, or where it will be delivered to, and in what sequence.

Referring further to FIG. 5, by way of example only, the control system 100 may be aware of a sequence of events such that a drone 16 with a unique ID "G" is delivered to a location "G'" within the wellbore, while another drone with a unique ID "F" is delivered to a location "F'", and so on. This ability to deploy and assign locations for drones may facilitate an uninterrupted fracturing process due to the control system's 100 knowledge of the specific/predetermined locations (location "G'", location "F'", and so on) and the respective drones to be deployed to those specific locations, without turning frac pumps on/off between deployments. The assignment of drones to the specific location will be incorporated into the self-test analysis and such information can be used by the control system 100 in real time or stored for future analysis when drones are deployed to travel in the wellbore. The unique ID may be a number, letter, or any combinations thereof.

Figure 6:
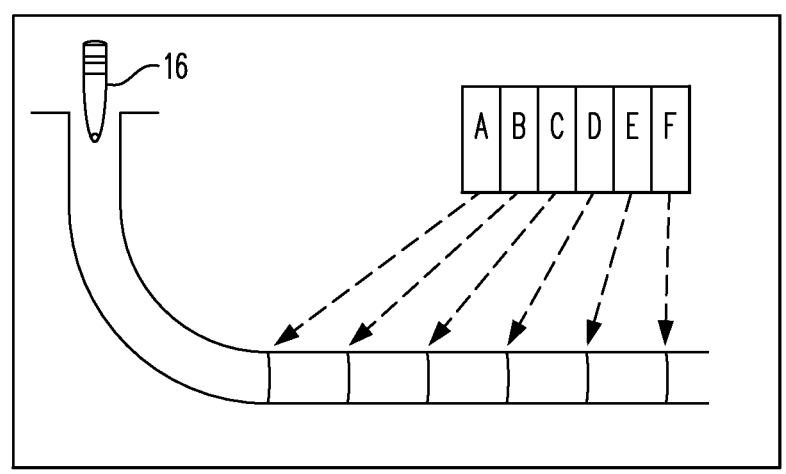
FIG. 6 is a conceptional diagram of a wellbore illustrated in conjunction with a magazine chamber for explaining a drag and drop interface according to an exemplary embodiment of the present disclosure.

Referring now to FIG. 6, in one embodiment, the control system 100 provides a control interface to allow an operator to drag a virtual icon corresponding to the drone 16 to assign a desired location of the drone 16 in the wellbore. Dashed lines represent active dragging of a drone to a specific desired location (e.g., CCL location).

Figure 7:
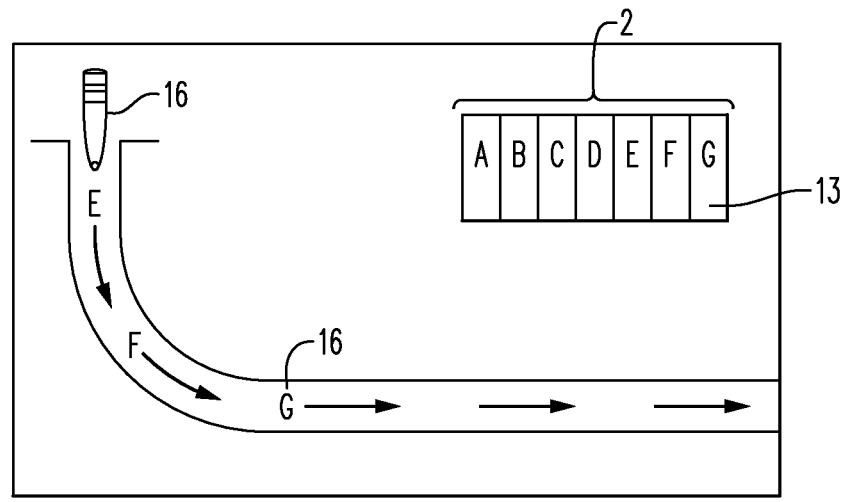
FIG. 7 is a conceptional diagram of a wellbore illustrated in conjunction with a magazine chamber for explaining an interface of tracking drones therein according to an exemplary embodiment of the present disclosure.
Figure 8:
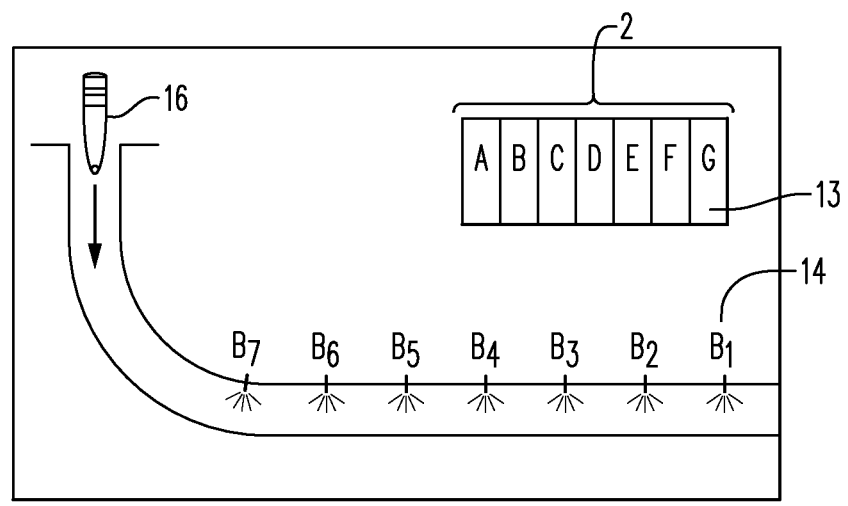
FIG. 8 is a conceptional diagram of a wellbore illustrated in conjunction with a magazine chamber for explaining an interface showing active transmit status according to an exemplary embodiment of the present disclosure.

In addition, referring now to FIG. 7, in one embodiment, the control system 100 provides a control interface to allow the operator to simply click on a drone for a detailed description regarding, e.g., type of tool, tool ID, assigned location, and self-test results/functionality. Also, the control system 100 may further provide an interface to monitor and display the markers' active transmit status in addition to known casing collar locations, as illustrated in FIG. 8.

After a drone 16 has been deployed into a wellbore, the control system 100 can approximate the location/depth and detonation status of a drone. As previously discussed, the location/depth of a drone will be calculated based on a time and fluid speed, and the detonation status of the drone 16 will be determined by vibration or acoustic sensor readings taken at the wellhead. The approximate calculated location/depth of the drone 16 can be relayed in real-time to the control system 100, as depicted in FIG. 7.

Figure 4B:
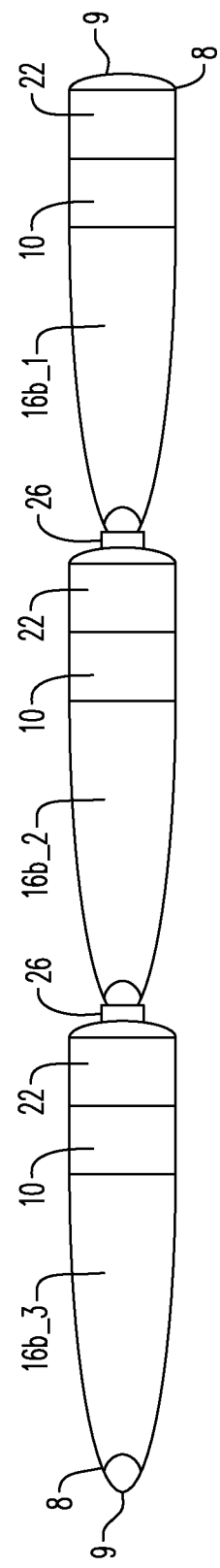
FIG. 4B is a perspective view of a string of drones powered by a single battery at the tail end according to an exemplary embodiment of the present disclosure.

Turning now to embodiments where drones 16 are connected in a string (i.e., a string of drones) to travel in a wellbore, as illustrated in FIGS. 4A and 4B.

In one aspect, referring to FIG. 4A, each individual drone 16a_1 to 16a_3 can have its own internal power source 20 (e.g., battery), trigger circuit 22, and on-board control system 10. There may be electromechanical connections 26 between drones, the detail of these connections is not shown here.

In another aspect, referring to FIG. 4B, there can be a single internal power source 20 at the tail end of the string of drones that will power all drones 16b_1 to 16b_3. Each drone 16b_1 to 16b_3 will still have its own trigger circuit 22 and on-board computer system 10. In either case, the internal power source 20 will only engage under specific circumstances, as previously discussed. As depicted in FIG. 4B, there may be a string of drones with a single internal power source 20 at the tail end of the string. There may be electromechanical connections 26 between the drones, the detail of these connections is not shown here.

Figure 11A:
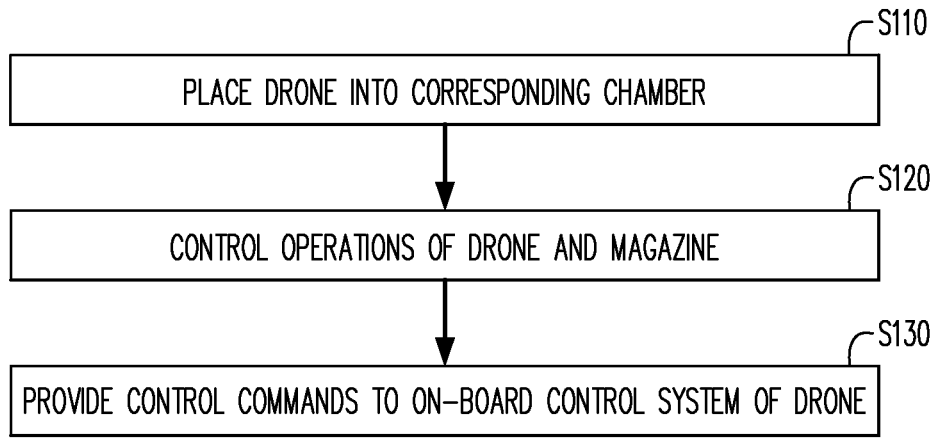
FIGS. 11A and 11B are flow charts illustrating a method for controlling deployment of a drone including a wellbore tool into a wellbore.
Figure 11B:
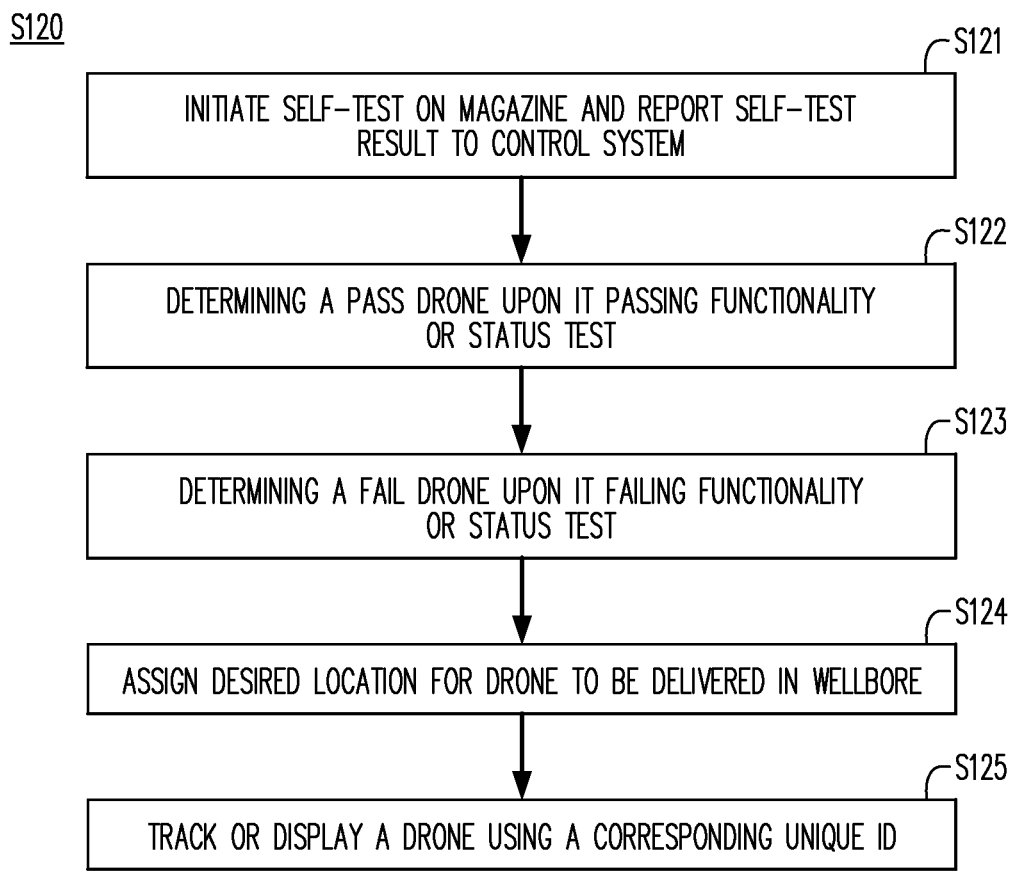

FIGS. 11A and 11B are flow charts illustrating a method for controlling deployment of a drone 16 including a wellbore tool 240 into a wellbore.

Referring to FIG. 11A, at S110, the drone 16 is placed into a corresponding one of one or more chambers 13 included in a magazine 2. In addition, the control system 100 controls operations of the drone 16 and the magazine 2 (S120) and control commands are provided to an on-board control system 10 (S130).

Referring now to FIG. 11B, the controlling of operations of the drone 16 and the magazine 2 (S120) may include: controlling the magazine 2 to initiate a self-test on the magazine 2 and report a result of the self-test to the control system 100 (S121); determining the drone 16 as a pass drone upon the drone 16 passing a test on functionality or status of the drone (S122); determining another drone as a fail drone upon the another drone failing the test on the functionality or status of the another drone (S123); assigning a desired location where the drone 16 is delivered in the wellbore (S124); and tracking or displaying the drone 16 using a corresponding unique ID 15 (S125).

Further, prior to deployment of the drone 16, the external power source 1000 supplies electric power to the drone and after the deployment of the drone 16 into the wellbore, supplying no power to the wellbore tool 240 until one or more power trigger events occur (not shown).

Still further, after the deployment of the drone 16 into the wellbore, an internal power source of the drone 16 may be inactivated to the wellbore tool and/or the on-board control system 10 until the one or more power trigger events occur (not shown).

Hereinafter, more detail operations and algorithms of a control terminal 100' of the control system 100 in conjunction with a drone 16, a magazine 2, a launcher 3, a lift 5, a pressure chamber 23, a magazine chamber 13, and a wellhead 200 are described with reference to FIGS. 12-18.

With regard to the drone 16, there are at least two states that need to be controlled: pre-deployment (Static) state and post-deployment (Dynamic) state. During the pre-deployment state, there is no power to the drone 16 and the battery (e.g., 20) is not connected to any of control means until sensors engage the battery, this is based on a wellbore environment including, but are not limited to: a depth, temperature, pressure, time, or the like.

In the pre-deployment state, operations of the drone 16 will be described with respect to cases where remote control interfaces and local control/indication interfaces are applied. Local controls are attached to the system 100 and may include buttons or a touch screen/touch pad on the device. In the event that remote control interfaces are utilized, such interfaces may be a computer that is at a location remote/far away from the device, such as a location other than adjacent the site of deployment.

Figure 12:
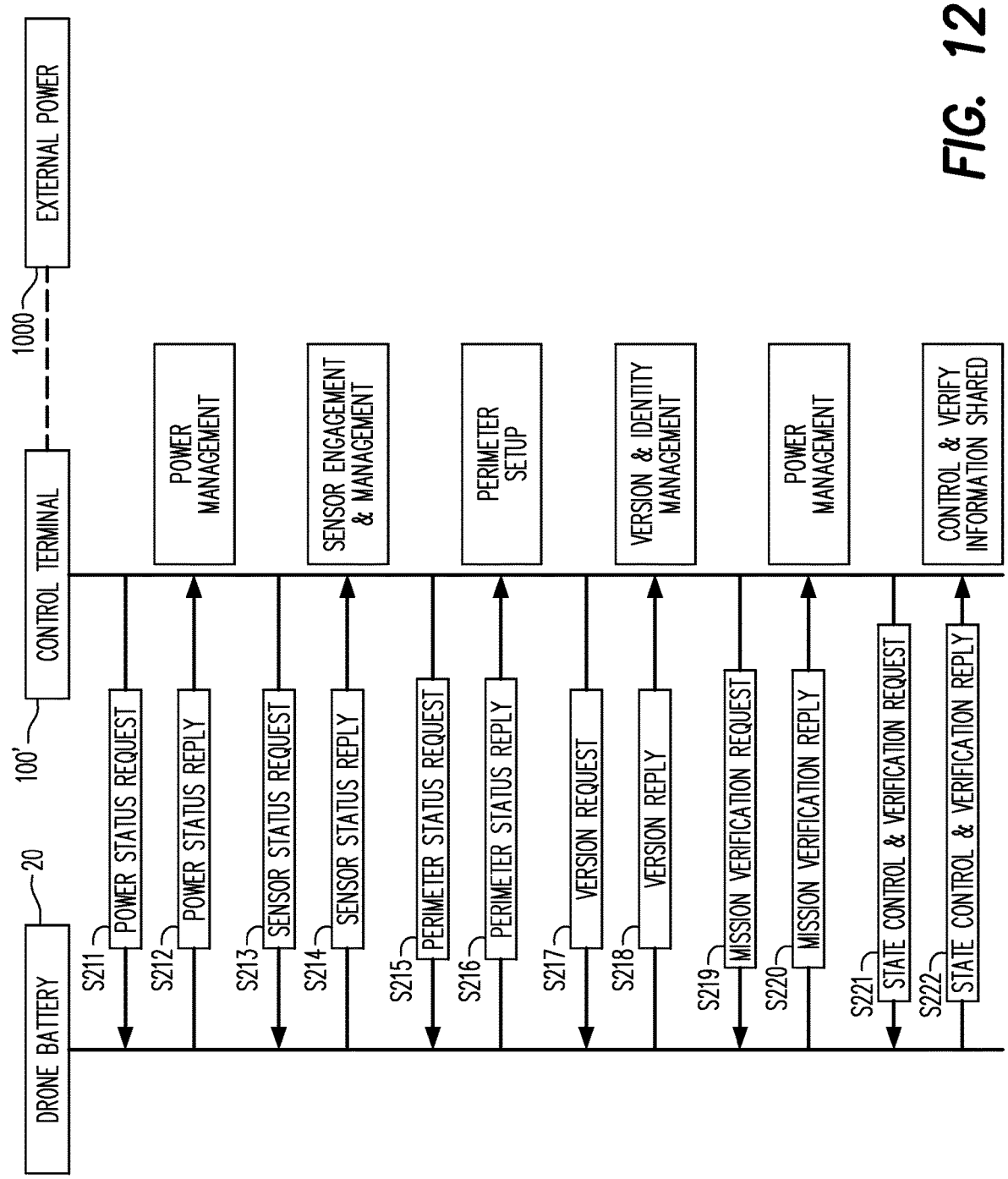
FIG. 12 is a flow chart of remote control interfaces-controlled message exchanges between a drone and a control terminal during self-tests on the drone, according to an exemplary embodiment of the present disclosure.

The remote control interfaces may include, but are not limited to: a touch screen interface, wireless button control, wireless tablet control, computer control, wired control box that is a safe distance from the system/component. Referring to FIG. 12, illustrated is a flow chart of remote control interfaces-controlled message exchanges between a drone 16 and a control terminal 100' of the control system 100 during self-tests on the drone 16.

In an embodiment, the self-tests on the drone, include a power status, a sensor status, a perimeter setup, a version control, a mission control, and a state control and verification.

Regarding the power status, the control terminal 100' may send a power status request message to the drone battery 20 (S211) and receive a power status reply message from the drone battery 20 (S212). The power status reply message may include information such as a drone battery power not being engaged; and the drone battery not powering a control system at this time—e.g., the battery will only be engaged based on perimeter sensors and when the drone has been deployed (see perimeter setup for sensor perimeters/algorithms that will be described below). In addition, the power status reply may further include information such as trigger not being engaged at this time; and drone unique ID and self-test results.

Regarding the sensor status, the control terminal 100' may send a sensor status request message to the drone battery 20 (S213) and receive a sensor status reply from the drone battery 20 (S214), including information such as the sensors being engaged to the control system. For example, the sensor status reply may be either "Yes" or "No" response indicating whether the sensors have been engaged to the control system.

Regarding the perimeter setup status, the control terminal 100' may send a perimeter setup status request message to the drone battery 20 (S215) and receive a perimeter setup status reply message from the drone battery 20 (S216), indicating the battery will only be engaged under the following circumstance at 'X' PSI/pressure, 'X' temperature, 'X' depth, 'X' distance travelled, 'X' time, or the like.

Regarding the version control, the control terminal 100' may send a version request message to the drone battery 20 (S217) and receive a version status reply message from the drone battery 20 (S218), including information such as: a version that has been downloaded onto the drone for program algorithms; and an artificial intelligence (AI)-based program algorithms (e.g., machine-learning algorithms) and management for depth correlation—e.g., Train AI and set algorithms.

Regarding the mission control, the control terminal 100' may send a mission verification request message to the drone battery 20 (S219) and receive a mission verification reply message from the drone battery 20 (S220), including information such as: a mission plan that has been downloaded onto the drone. For example, the mission plan may include: a pre-determined location assignment; and power engagement at programmed depth and/or time and/or temperature and/or pressure.

Regarding the state control and verification, the control terminal 100' may send a state control and verification request message to the drone battery 20 (S221) and receive a state control and verification reply message S222 from the drone battery 20, including: information being shared with the outside world through interfaces; and information regarding state, status control, and verification being shared with the outside world via interfaces.

In addition, the local control interfaces/indications may be associated with a local indication panel on the drone 16, and a local control functionality thereon.

First, the local indication panel may include, but is not limited to: an interface directly on the drone or a wired remote/interface that is a safe distance from the system. In the case of drones loaded into a magazine, the indication can be a part of a magazine indication panel. For example, the indication can be a part of one large interface showing all pre-deployment control points. The indications may be associated with: a drone status request, a sensor status request, a perimeter setup status request, a version request, and a mission verification request. The indications of the drone status request may be associated with: a visual aid showing active or inactive a drone battery; and a panel showing a drone unique ID and self-test results (e.g., pass or fail). The indications of the sensor status request may be associated with: a visual aid showing active or inactive sensor. The indications of the perimeter setup status may be associated with: a panel showing parameters set for that specific drone. The indications of the version request may be associated with a panel showing a downloaded version on the drone. The indications of the mission verification request may be associated with the drone mission verification including: a panel showing a drone mission and plan (e.g., 3D representation of the drone mission).

Next, regarding the local control functionality, the local control may include, but is not limited to: a touch screen interface or manual buttons for control on the system/subsystem (e.g., drone, magazine and other elements), wired remote control located a safe distance from the system/subsystem, or any other control methods. In the case of a loaded drone, the local control can be a part of the magazine control panel.

The local control functionalities may be associated with the drone status request, a sensor status request, a perimeter setup status, a version request, and a mission verification request. The local controls for the drone status request include: manually pressing buttons to show status of the drone including battery engagement status, a location of the drone in a magazine chamber (e.g., chamber location), a drone unique ID and self-test results, or the like. The local controls for the sensor status request include manually pressing buttons to engage sensors such as "On" or "Off". The local controls for the perimeter setup request include manually pressing buttons to show the perimeter setup status for each individual drone, such as a pressure, a temperature, a depth, a time, and a distance traveled. The local controls for the version request include manually pressing buttons to show a downloaded version on the drone. The local controls for the version request include manually pressing buttons to show status of the drone, such as a panel showing a drone mission and plan such as 3D representation of the drone mission.

In the post-deployment state, control operations on the drone 16 will be described with respect to cases where remote control interfaces and local control/indication interfaces are applied.

Figure 13:
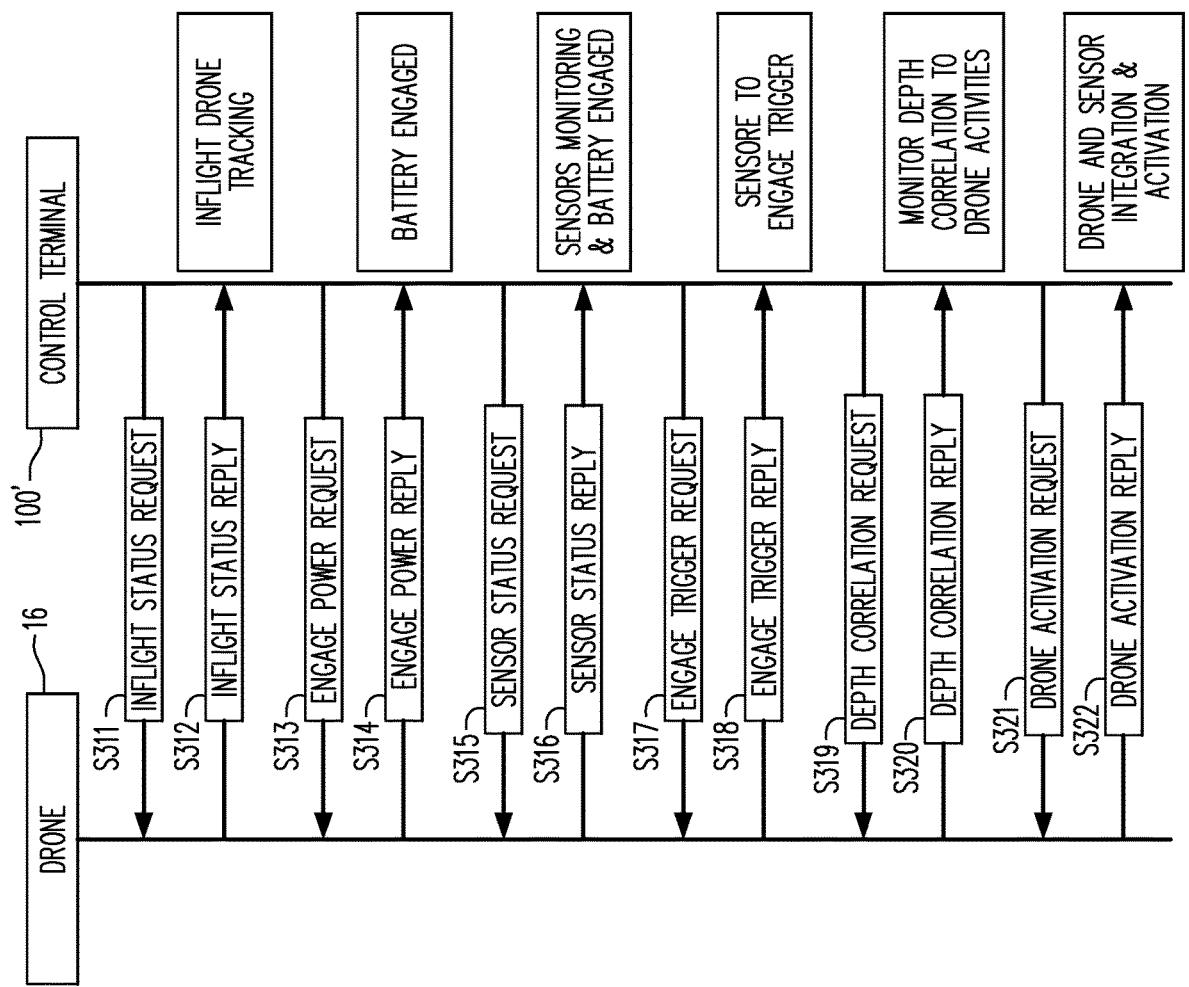
FIG. 13 is a flow chart of remote control interfaces-controlled message exchanges between a drone and a control terminal in the post-deployment state, according to an exemplary embodiment of the present disclosure.

The remote-control interfaces may include, but are not limited to: a touch screen interface, wireless button control, wireless tablet control, computer control, wired control box that is a safe distance from the system/component. Referring to FIG. 13, illustrated is a flow chart of remote control interfaces-controlled message exchanges between the drone 16 and the control terminal 100' in the post-deployment state (e.g., inflight down the wellbore).

In one embodiment, the control messages between the drone 16 and the control terminal 100' may be associated with an inflight status, a power engagement, a sensor status, a trigger engagement, a depth correlation algorithm, and a tool activation process.

Regarding the infight status, the control terminal 100' may send an inflight status request message to the drone 16 (S311) and receive an inflight status reply message from the drone 16 (S312). The inflight status reply message may include information associated with a drone status and location while traveling inside the wellbore which may be monitored based on, e.g., cross-correlating measurements between sensors with different types.

Regarding the power engagement, the control terminal 100' may send an engage power request message to the drone 16 (S313) and receive an engage power reply message from the drone 16 (S314). The engage power reply message may include information associated with the battery being engaged based on one or more of perimeters being sensed, such as a depth, a time, a temperature, a pressure based, and a distance traveled.

Regarding the sensor engagement, the control system 100 may send a message to the drone indicating a sensor status request (S315) and receive a sensor status reply from the drone 16 (S316) that includes the following information, but are not limited to: whether an environment for sensors monitoring and sensing is "Active" or "Inactive"; whether a sensor has engaged a battery (e.g., power to control and trigger).

Regarding the trigger engagement, the control terminal 100' may send an engage trigger request to the drone 16 (S317) and receive an engage trigger reply message from the drone 16 (S318). The engagement trigger reply message may be either "Yes" or "No" response which depends on what is being sensed in the wellbore—e.g., is it time to activate the trigger?; is it time to perforate?; this is based on a location in the wellbore; and sensors can determine a location.

Regarding the depth correlation algorithm that can monitor a depth correlation to activities including power engagement and deployment, the control terminal 100' may send a depth correlation request message to the drone 16 (S319) and receive a depth correlation reply message from the drone 16 (S320). The depth correlation reply message may include information, e.g., whether a depth correlation to engage activities including the power engagement and the drone activation is being monitored.

Regarding the tools activation process, the control terminal 100' may send a drone activation request message to the drone 16 (S321) and receive a drone activation reply message S322 from the drone 16. The drone activation reply message may include information, e.g., whether a drone is activated (S322).

In addition, the local control interfaces/indications may be associated with a local indication panel on the drone 16, and a local control functionality thereon.

First, the local indication panel may include, but is not limited to: an interface directly on the drone or a wired remote/interface that is a safe distance from the machine (e.g., drone). In the case of drones loaded into a magazine, all indications can be part of a magazine indication panel, and all indications can be seen on one panel. For example, the indications may be associated with: an inflight status, an engage power, a sensor status, an engage trigger, a depth correlation, and a drone activation. The indications of the inflight status may be associated with a magazine panel indicating an active drone travelling down a wellbore. For example, the magazine panel may show a drone unique ID, a travelling speed of each individual traveling drone entering the wellbore, an approximate location of the drone, and all other functions associated with the drone as it is traveling down the wellbore. Inflight status indications for multiple drones may be shown on the panel. The indications of the engage power may be associated with a magazine panel indicating when power is engaged on the drone. This indication may be a part of the inflight status panel indication. For example, the indication can be a simple symbol of a battery that lights up when engaged and lights off (e.g., dark) when not engaged. The indications of the sensor status may be associated with: a magazine panel indicating when a sensor is active or inactive. For example, the indication can be a part of the inflight status panel indication. The indications of the engage trigger may be associated with: a magazine panel indicating when trigger is engaged. For example, the indications on the panel may include "trigger engaged", "trigger inactive", "trigger ready", "triggered", or the like. The indications of the depth correlation may be associated with: a magazine panel indicating drone depth correlation activities. For example, the indication can be a part of the inflight status panel indication. The indications of the drone activation may be associated with: a magazine panel indicating when the drone activation process and sensor integration are complete. For example, the indication can be a part of the inflight status panel indication, and the indications on the panel may include "drone activated", "drone inactive", "drone waiting", "drone travelling", or the like.

Next, regarding the local control functionality, the local control may include, but is not limited to: a touch screen interface or manual buttons for control on the machine/system, wired remote control located a safe distance from the machine/system, or any other control methods. In the case of a loaded drone, the local control can be a part of the magazine control panel.

The local control functionalities may be associated with: an inflight status request, an engage power, a sensor status, an engage trigger, a depth correlation, and a drone activation request. The local controls for the inflight status request include manually pressing buttons to show an inflight status of the drone—e.g., no control is needed for the drone inflight here. The local controls for the engage power include manually pressing buttons to engage or disengage drone power. The local controls for the sensor status include manually pressing a button to engage a sensor and/or pressing a button to view a sensor status. The local controls for the engage trigger include manually pressing a button to engage a trigger and/or pressing a button to view a trigger status. The local controls for the depth correlation include manually pressing buttons to indicate a depth correlation request. The local controls for the drone activation request include manually pressing buttons to activate and deactivate drone activity.

Turning now to embodiments regarding controls on the magazine and actions, operations of the magazine 2 will be described with respect to cases where remote control interfaces and a local control/indication interfaces are applied.

Figure 14:
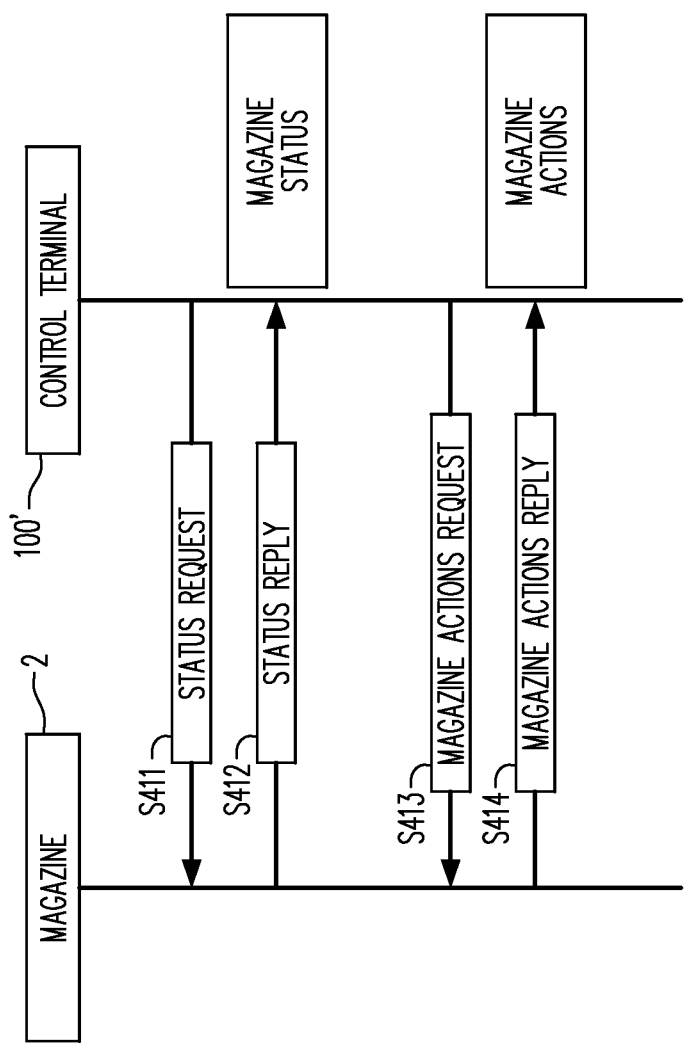
FIG. 14 is a flow chart of remote control interfaces-controlled message exchanges between a magazine and a control terminal, according to an exemplary embodiment of the present disclosure.

The remote control interfaces may include, but are not limited to: a touch screen interface, wireless button control, wireless tablet control, computer control, wired control box that is a safe distance from the system/component. Referring to FIG. 14, illustrated is a flow chart of remote control interfaces-controlled message exchanges between a magazine 2 and a control terminal 100' including: a magazine status and a magazine action.

Regarding the magazine status, the control terminal 100' may send a magazine status request message to the magazine 2 (S411) and receive a magazine status reply message from the magazine 2 (S412). The magazine status reply may include information associated with: self-test results on the magazine and the magazine contents; and the magazine contents and unique IDs (e.g., drone ID, magazine chamber ID). For example, the self-test results on the magazine and the magazine contents may be associated with magazine chamber(s) loaded with drone(s), attachments to a lubricator, lift, chamber contents functioning properly, and a magazine chain functioning properly.

Regarding the magazine actions, the control terminal 100' may send a magazine action request message to the magazine 2 (S413) and receive a magazine action reply message from the magazine 2 (S414). The magazine action reply message may include information associated with engaging self-testing of contents, auto-locking a magazine chamber for a failed self-test, or the like.

In addition, the local control interfaces/indications may be associated with a local indication panel on the magazine 2, and a local control functionality thereon.

First, the local indication panel may include, but is not limited to: an interface directly on the magazine or a wired remote/interface that is a safe distance from the system/component (e.g., magazine). The indications may be associated with: a magazine status and a magazine action. The indications of the magazine status may be associated with: a magazine panel showing all chambers with their unique IDs; a magazine panel lighting up "green" for a chamber tested and approved for use and displaying the magazine chamber and a corresponding drone unique ID; and a magazine panel lighting up "red" for a chamber tested of which content failed on self-test and not approved for use and displaying the magazine chamber and a corresponding drone unique ID—e.g., the chamber may also have a lock symbol to indicate that it has been auto-locked due to a failed-self test, or user control over the chamber. The indications of the magazine status may be associated with a magazine panel showing a connection with a lift system, greater details of which will be described later. The indications of the magazine action may be associated with: a magazine panel indicating auto-locked chambers and a magazine panel indicating self-tests in progress.

Next, regarding the local control functionality, the local control may include, but is not limited to: a touch screen interface or manual buttons for control on the machine/system (e.g., magazine), wired remote control located a safe distance from the machine/system, or any other control methods.

The local control functionalities may be associated with a magazine status request and a magazine action. The local controls for the magazine status request include manually pressing buttons to show magazine status including: chamber contents, a unique ID and self-test results; attachments to a lubricator, lift, chamber contents functioning properly; and a magazine chain functioning properly. The local controls for the magazine action include manually pressing buttons to engage self-testing of contents, auto-locking a magazine chamber for a failed self-test, or the like.

Next, turning now to embodiments regarding controls on the drone 16 and the magazine 2, operations of the magazine 2 and the drones 16 will be described with respect to cases where remote control interfaces and a local control/indication interfaces are applied.

Figure 15:
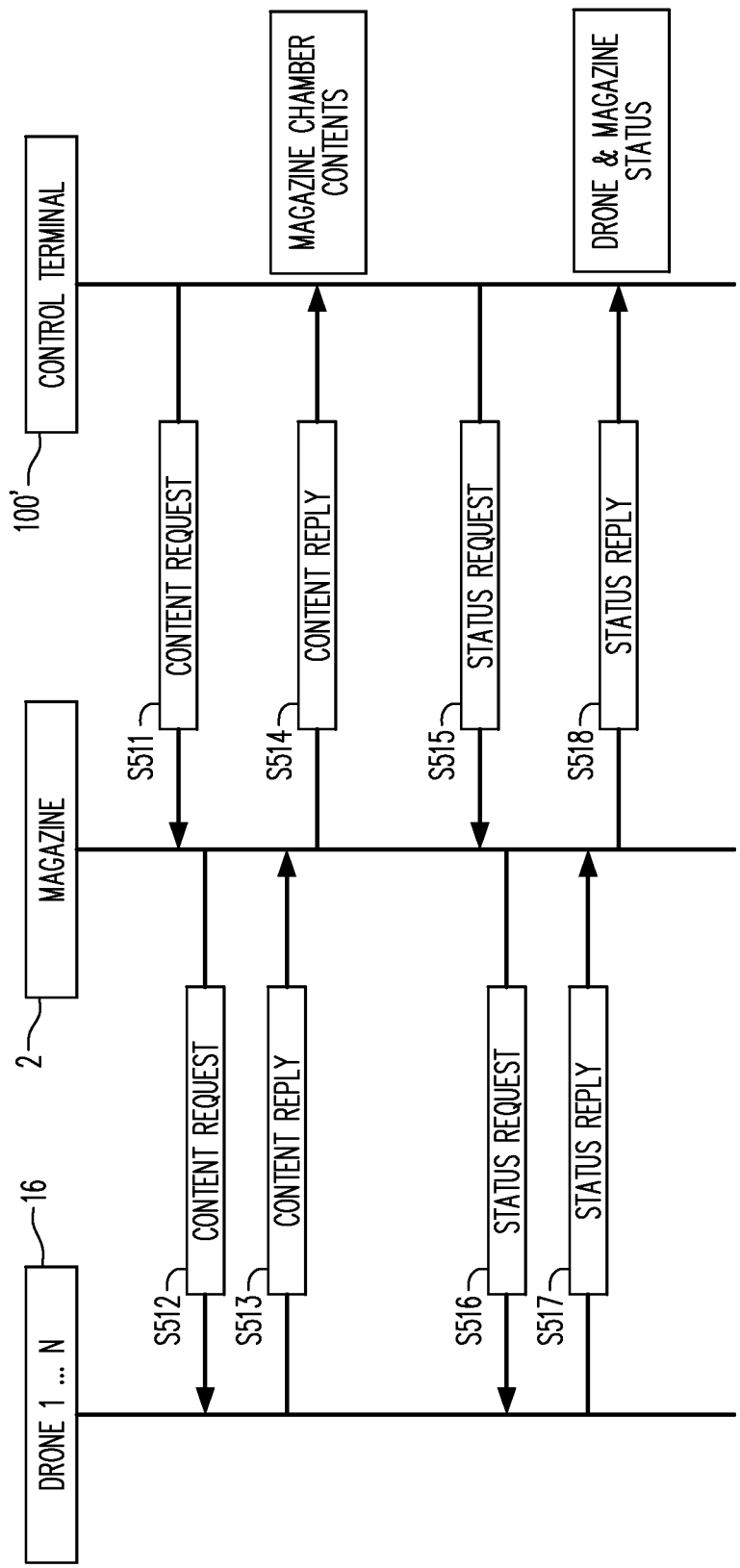
FIG. 15 is a flow chart of remote control interfaces-controlled message exchanges between a control terminal and each of a magazine and a drone, according to an exemplary embodiment of the present disclosure.

The remote control interfaces may include, but are not limited to: a touch screen interface, wireless button control, wireless tablet control, computer control, wired control box that is a safe distance from the system/component (e.g., drone and/or magazine). Referring to FIG. 15, illustrated is a flow chart of remote control interfaces-controlled message exchanges between the control terminal 100' and each of the magazine 2 and the drone 16.

Referring further to FIG. 15, the control terminal 100' may send a content request message to the magazine 2 (S511), and the magazine 2 may send a content request message to each drone 16 (S512). As a response to the content request from the magazine 2, the drone 16 may send a status reply message to the magazine 2 (S513), including information associated with identifications of drone tools (e.g., perforating gun, plug, etc.), drone unique ID, or the like. In addition, as a response to the content request from the control terminal 100', the magazine chamber may send a status reply message to the control terminal 100' (S514), including information associated with contents of the magazine chamber (e.g., drone unique ID).

Referring further to FIG. 15, the control terminal 100' may send a magazine status request message to the magazine 2 (e.g., magazine chamber) (S515), and the magazine 2 may send a drone status request message to each drone 16 (S516). As a response to the drone status request from the magazine 2, the drone 16 may send a drone status reply message to the magazine 2 (S517), including information associated with drones connected—e.g., a drone passed a self-test, a drone having all contents downloaded such as a mission, wellbore topology, or the like, and a drone being loaded and connected to the magazine chamber. As a response to the magazine status request from the control terminal 100', the magazine 2 (e.g., magazine chamber) may send a magazine status reply message to the control terminal 100' (S518), including information associated with the magazine chambers being ready for deployment into a pressure chamber/caisson. For example, such information may indicate that a magazine chamber content includes all content and algorithms downloaded, and the downloaded contents can include a mission and wellbore topology, and a drone being loaded and connected to a magazine.

In addition, the local control interfaces/indications may be associated with a local indication panel on the magazine 2 and/or and a magazine chamber 13, and a local control functionality thereon.

First, the local indication panel may include, but is not limited to: an interface directly on the magazine/magazine chamber, or a wired remote/interface that is a safe distance from the system/component (e.g., magazine and/or drone). The indications may be associated with: content requests for the magazine chamber and the drone whose indications include a magazine panel showing loaded contents and drone information; and status requests (e.g., magazine status request and drone status request) for the magazine and the drone whose indications include a magazine panel showing a magazine and drone status.

Next, regarding the local control functionality, the local control may include, but is not limited to: a touch screen interface or manual buttons for control on the system/component (e.g., magazine and/or drone), wired remote control located a safe distance from the machine/system, or any other control methods.

The local control functionalities may be associated with: content requests for the magazine chamber and the drone including pressing buttons to show contents and all related information (e.g., magazine chamber and drone unique ID) pertaining to the magazine chamber and the drone. The local controls for the status requests for the magazine 2 and the drone 16 include pressing buttons to show content status (e.g., a self-testing, downloading onto a drone).

Next, turning now to embodiments regarding controls on a lift 5 and a magazine 2, control operations of the lift 5 and the magazine 2 will be described with respect to cases where remote control interfaces and local control/indication interface are applied.

Figure 16:
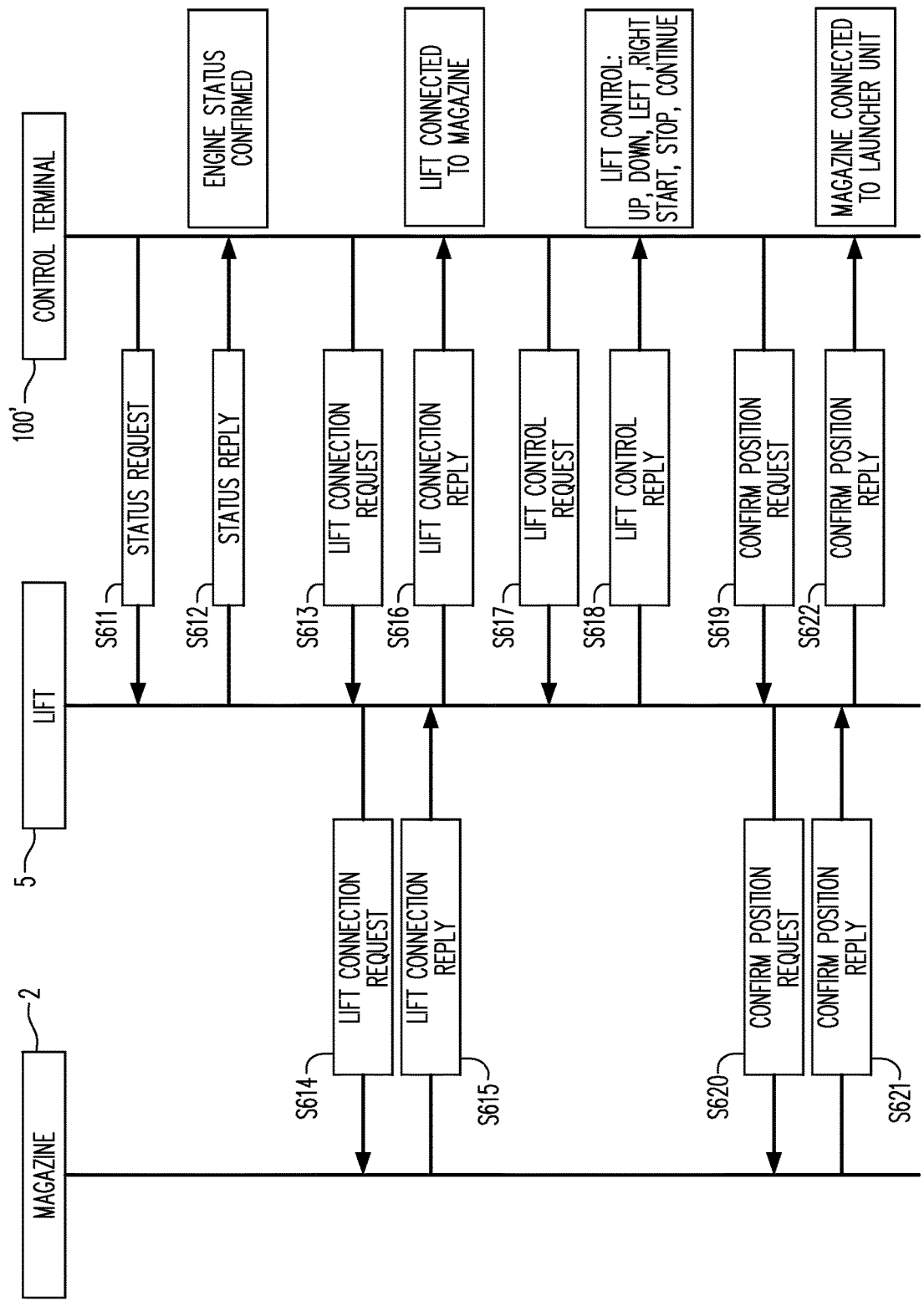
FIG. 16 is a flow chart of remote control interfaces-controlled message exchanges between a control terminal and each of a lift and a magazine, according to an exemplary embodiment of the present disclosure.

The remote control interfaces may include, but are not limited to: a touch screen interface, wireless button control, wireless tablet control, computer control, wired control box that is a safe distance from the system/component (e.g., lift and/or magazine). Referring to FIG. 16, illustrated is a flow chart of remote control interfaces-controlled message exchanges between the control terminal 100' and each of the lift 5 and the magazine 2.

Referring further to FIG. 16, the control terminal 100' may send a lift status request message to the lift 5 (S611), and the lift 5 may send a lift status reply message to the control terminal 100' (S612). The lift status reply message includes information associated with a lift engine being functioning appropriately and ready for use. In addition, the control terminal 100' may send a lift connection request message to the lift 5 (S613), and the lift 5 may send a lift connection request to the magazine 2 (S614). As a response to the lift connection request from the lift 5, the magazine 2 may send a lift connection status reply message to the lift 5 (S615). The lift connection status reply message, including information such as the magazine being successfully connected to the lift (S615), and the lift 5 may send a lift connection status reply message to the control terminal 100', including information such as the lift being successfully connected to the magazine (S616). Further, the control terminal 100' may send a lift control request message to the lift 5 (S617), and the lift 5 may send a lift control reply message to the control terminal 100', including information regarding various lift's actions such as a lift up, down, left, right, start, stop, continue, or the like (S618).

Referring further to FIG. 16, the control terminal 100' may send a confirm position request message to the lift 5 (S619), and the lift 5 may send a confirm position request message to the magazine 2 (S620). As a response to the confirm position request from the lift 5, the magazine 2 may send a confirm position reply message to the lift 5, including information such as: the magazine being appropriately lifted for connection to the launcher; and the magazine being connected to the launcher (S621), and the lift 5 may send a confirm position reply message to the control terminal 100', including information such as the lift being positioned appropriately, e.g., at a correct height for a magazine connection to a launcher (S622).

In addition, the local control interfaces/indications may be associated with a local indication panel on the lift 5 and/or the magazine 2, and a local control functionality thereon.

First, the local indication panel may include, but is not limited to: an interface directly on the lift 5 and/or the magazine 2, or a wired remote/interface that is a safe distance from the system/component (e.g., lift and/or magazine). The indications may be associated with: a status request for the lift 5, a lift connection, a lift control, and a confirm position. The indications of the status request for the lift may be associated with a lift engine status such as: a lift panel lighting up "green" and displaying "lift ready"; and a light panel lighting up "red" and displaying "lift error". The indication of the lift connection may be associated with a magazine connection status of the lift such as: both panels (e.g., panels on the lift and the magazine) lighting up "green" and displaying "connected; and the both panels lighting up "red" and "unable to connect". The indications of the lift control may be associated with a lift movement status such as: the lift panel showing a lift movement (e.g., a lift's up, down, left, right, start, continue, lifting, stop, etc.); and the lift panel showing a lift position in real time in relation to a launcher. The indications of the confirm position may be associated with the lift reaching its position and the magazine being connected to the launcher such as: a lift panel lighting up "green" and displaying "positioned"; the magazine panel lighting up "green" and displaying "connected to a launcher".

Next, regarding the local control functionality, the local control may include, but is not limited to: a touch screen interface or manual buttons for control on the system/component (e.g., lift and magazine), wired remote control located a safe distance from the machine/system, or any other control methods.

The local control functionalities may be associated with: a status request, a lift connection, a lift control, and a confirm position. The local controls for the status request include manually pressing buttons to show a light engine status. The local controls for the lift connection include manually pressing buttons to connect the lift and the magazine. The local controls for the lift control include manually pressing buttons to control a lift position such as a lift's up, down, left, right, start, continue, stop, etc. The local controls for the confirm position request include manually pressing buttons to show status of a lift position, manually pressing buttons to show status of a magazine connection, etc.

Next, turning now to embodiments regarding controls on a magazine chamber 13 and a pressure chamber 23, control operations of the magazine chamber 13 and the pressure chamber 23 will be described with respect to cases where remote control interfaces and local control/indication interfaces are applied.

Figure 17:
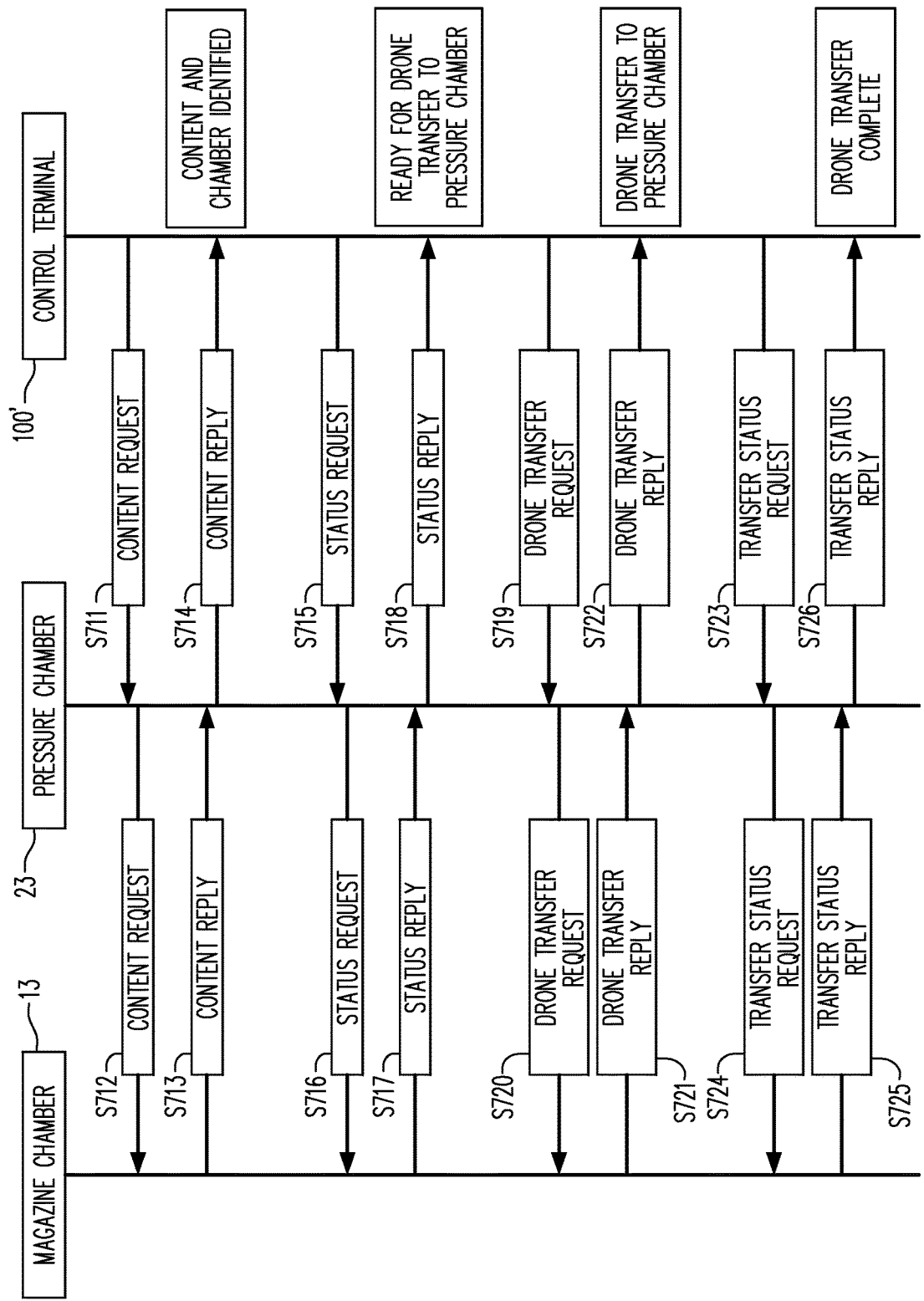
FIG. 17 is a flow chart of remote control interfaces-controlled message exchanges between a control terminal and each of a magazine and a pressure chamber, according to an exemplary embodiment of the present disclosure.

The remote-control interfaces may include, but are not limited to: a touch screen interface, wireless button control, wireless tablet control, computer control, wired control box that is a safe distance from the system/component (e.g., pressure chamber and/or magazine chamber). Referring to FIG. 17, illustrated is a flow chart of remote control interfaces-controlled message exchanges between a control terminal 100' and each of the magazine chamber 13 and the pressure chamber 23.

Referring further to FIG. 17, the control terminal 100' may send a content request message to the pressure chamber 23 (S711), and the pressure chamber 23 may send a content request message to the magazine chamber 13 (S712). As a response to the content request message from the pressure chamber 23, the magazine chamber 13 may send a content reply message (S713). The content reply message may include information associated with identifying which magazine chamber is transferred to the pressure chamber (e.g., magazine chamber unique ID) and identifying the magazine chamber contents (e.g., drone unique ID). As a response to the content request message from the control terminal 100', the pressure chamber 23 may send a content reply message to the control terminal 100' (S714). The content reply message may include information associated with contents of the pressure chamber (e.g., drone unique ID).

Referring further to FIG. 17, the control terminal 100' may send a status request message to the pressure chamber 23 (S715), and the pressure chamber 23 may send a status request message to the magazine chamber 13 (S716). As a response to the status request message from the pressure chamber 23, the magazine chamber 13 may send a status reply message to the pressure chamber 23 (S717). The status request reply message may include information associated with the magazine chamber being ready for transferring of a drone from the magazine chamber to the pressure chamber—e.g., the magazine chamber may be ready only if passed a self-test and a status request and reply can be done for each chamber, or can be set a sequential status request and reply of all magazine chambers. As a response to the status request message from the control terminal 100', the pressure chamber 23 may send a status reply message to the control terminal 100' (S718). The status request reply message may include information associated with the pressure chamber being ready for transferring of a drone from the magazine chamber to the pressure chamber—e.g., the pressure chamber may be ready only if passed a self-test and a status request and reply can be done for each chamber, or can be set a sequential status request and reply of all magazine chambers.

Referring further to FIG. 17, the control terminal 100' may send a drone transfer request message to the pressure chamber 23 (S719), and the pressure chamber 23 may send a drone transfer request message to the magazine chamber 13 (S720). As a response to the drone transfer request message from the pressure chamber 23, the magazine chamber 13 may send a status reply message to the pressure chamber (S721). The status reply message may include information associated with: doors of the magazine chamber being open; a magazine chain having moved a drone into the pressure chamber; and drones can be individually transferred into the pressure chamber or can be pre-programmed to transfer a plurality of drones into the pressure chamber in a sequential, uninterrupted manner, or the like. The pressure chamber 23 may send a corresponding reply message S722 to the control terminal 100'.

Referring further to FIG. 17, the control terminal 100' may send a transfer status request message to the pressure chamber 23 (S723), and the pressure chamber 23 may send a transfer status request message to the magazine chamber 13 (S724). As a response to the transfer status request message from the pressure chamber 23, the magazine chamber 13 may send a status reply message to the pressure chamber (S725). The status reply message may include information associated with: the magazine chain having moved a drone into the pressure chamber and being now empty; the magazine chamber doors having closed; and the magazine chain having aligned the next chamber with the pressure chamber for the next drone transfer—e.g., this control point may depend on whether individual drone is loaded or multiple (or sequential) drones are loaded. The pressure chamber 23 may send a corresponding reply message S726 to the control terminal 100'.

In addition, the local control interfaces/indications may be associated with a local indication panel on the magazine chamber 13 and/or the pressure chamber 23, and a local control functionality thereon.

First, the local indication panel may include, but is not limited to: an interface directly on the magazine chamber 13 and/or the pressure chamber 23, or a wired remote/interface that is a safe distance from the system/component (e.g., pressure chamber and/or magazine chamber). The indications may be associated with: content requests for the pressure chamber and the magazine chamber; status requests for the pressure chamber and the magazine chamber; a drone transfer status from the magazine chamber to the pressure chamber; and a drone deploy status indicating that a drone has been successfully transferred.

The indications of the content requests for the pressure chamber and the magazine chamber may be associated with: a magazine chamber panel lighting up "green" for a chamber tested and approved for use and displaying the magazine chamber and drone unique ID; a magazine chamber panel lighting up "red" for a chamber tested whose content failed on self-test and not approved for use and displaying the magazine chamber and drone unique ID; and a pressure chamber panel lighting up "green" for a content tested and approved for use and displaying the pressure chamber content (e.g., drone) unique ID—e.g., the pressure chamber will not light up red because the magazine chamber will not open to allow for the transfer of a drone into the pressure chamber if it has failed a self-test; the failed magazine chamber will be locked and skipped in the loading process; and the failed drone will be assessed and re-tested prior to use. The indications of the status requests for the pressure chamber and the magazine chamber may be associated with: both panels (e.g., panels on the pressure chamber and the magazine chamber) lighting up "green" and displaying "ready for transfer"; and both panels lighting up "red" and displaying "not ready for transfer". The indications of the drone transfer status may be associated with: a pressure chamber panel lighting up "green" and displaying "chamber doors open, drone transferred"; a magazine chamber panel lighting up "green" and displaying "chamber doors open, drone transferred"; and both panels that will light up "red" and displaying "unable to transfer drone" if there is a transfer issue. The indications of the drone deploy status may be associated with: both panels lighting up "green" and displaying "chamber doors closed, drone transferred".

Next, regarding the local control functionality, the local control may include, but is not limited to: a touch screen interface or manual buttons for control on the system/component (e.g., pressure chamber and/or magazine chamber), wired remote control located a safe distance from the machine/system, or any other control methods.

The local control functionalities may be associated with: of: the content requests, the status requests, the drone transfer, and the drone deploy status.

The local controls for the content requests include: manually pressing buttons to show contents of the magazine chamber and/or the pressure chamber, including unique IDs and self-test results. The local controls for the status requests include: manually pressing buttons to show if the pressure chamber is ready for the drone transfer; and manually pressing buttons to show if the magazine chamber is ready for the drone transfer. The local controls for the drone transfer include: manually pressing buttons to open both pressure chamber and magazine chamber doors; manually pressing buttons to engage the magazine chain; and manually pressing buttons to initiate a drone transfer to the pressure chamber. The local controls for the drone deploy status include: manually pressing buttons to close the pressure chamber and magazine chamber doors; pressing buttons to pressure seal the pressure chamber; and pressing buttons on the magazine chamber to engage the magazine chain to align the next chamber—e.g., this control point may depend on whether individual drone is loaded or multiple (or sequential) drones are loaded.

Turning now to embodiments regarding controls on a wellhead 200 and a pressure chamber 23, control operations of the wellhead 200 and the pressure chamber 23 will be described with respect to cases where remote control interfaces and local control/indication interfaces are applied.

Figure 18:
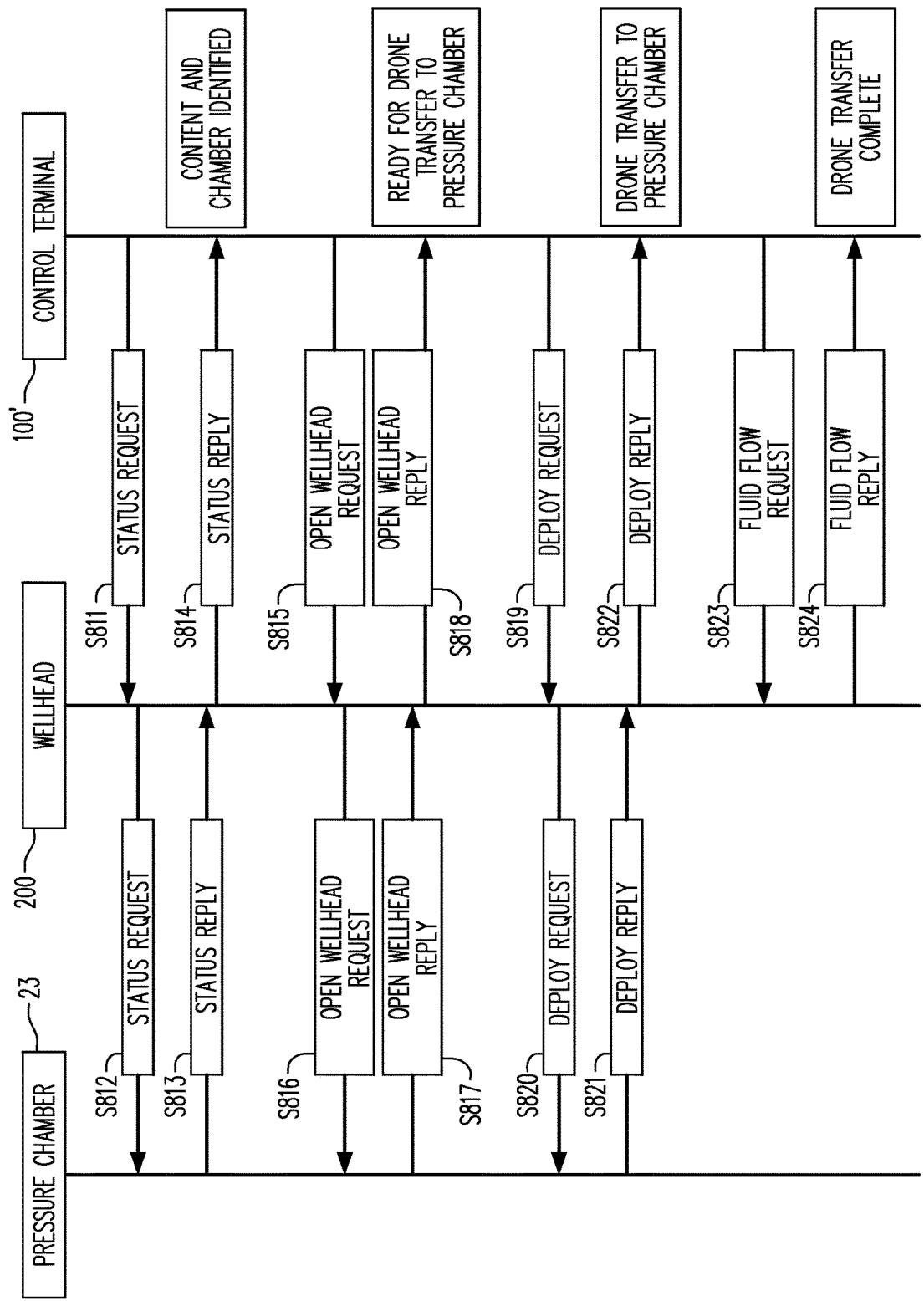
FIG. 18 is a flow chart of remote control interfaces-controlled message exchanges between a control terminal and each of a wellhead and a pressure chamber, according to an exemplary embodiment of the present disclosure.

The remote control interfaces may include, but are not limited to: a touch screen interface, wireless button control, wireless tablet control, computer control, wired control box that is a safe distance from the system/component (e.g., wellhead and/or pressure chamber). Referring to FIG. 18, illustrated is a flow chart of remote control interfaces-controlled message exchanges between a control terminal 100' and each of the wellhead 200 and the pressure chamber 23.

Referring further to FIG. 18, the control terminal 100' may send a status request message to the wellhead 200 (S811), and the wellhead 200 may send a status request message to the pressure chamber 23 (S812). As a response to the status request message from the wellhead 200, the pressure chamber 23 may send a status reply message (S813). The status reply message may include information such as a pressure equalization between the pressure chamber and the wellhead being achieved and a drone being in a designated position within the pressure chamber. As a response to the status request message from the control terminal 100', the wellhead 200 may send a status reply message (S814). The status reply message may include information such as a pressure equalization between the pressure chamber and the wellhead being achieved.

Referring further to FIG. 18, the control terminal 100' may send an open wellhead request message to the wellhead 200 (S815), and the wellhead 200 may send an open wellhead request message to the pressure chamber 23 (S816). As a response to the open wellhead request message from the wellhead 200, the pressure chamber 23 may send a status reply message to the wellhead 200 (S817). The status reply message may include information such as the pressure chamber being open to the wellhead. As a response to the open wellhead request message from the control terminal 100', the wellhead 200 may send a status reply message to the control terminal 100' (S818). The status reply message may include information such as the wellhead being open to the pressure chamber.

Regarding deploying a drone, the control terminal 100' may activate a piston or other mechanical device/(s) to push a drone into a wellbore. Referring further to FIG. 18, the control terminal 100' may send a deploy drone request message to the wellhead 200 (S819), and the wellhead 200 may send a deploy drone request message to the pressure chamber 23 (S820). As a response to the deploy drone request message from the wellhead 200, the pressure chamber 23 may send a status reply message to the wellhead 200 (S821). The status reply message may include information such as the pressure chamber piston being activated. As a response to the deploy drone request message from the control terminal 100', the wellhead 200 may send a status reply message to the control terminal 100' (S822). The status reply message may include information such as the wellhead being open for deployment.

Referring further to FIG. 18, the control terminal 100' may send a fluid flow request message to the wellhead 200 (S823), and the wellhead 200 may send a status reply message to the control terminal 100' (S824). The status reply message may include information such as fluid flow being engaged and fluid flowing at an appropriate rate for drone deployment.

In addition, the local control interfaces/indications may be associated with a local indication panel on the pressure chamber and/or the wellhead 200, and a local control functionality thereon.

First, the local indication panel may include, but is not limited to: an interface directly on the pressure chamber 23 and/or the wellhead 200, or a wired remote/interface that is a safe distance from the system/component (e.g., wellhead and/or pressure chamber). The indications may be associated with: status requests for a pressure equalization between the pressure chamber and the wellhead and conformation of a drone placement; an open wellhead; a deploy drone; and a fluid flow rate.

The indications of the status requests for the pressure equalization and the conformation of the drone placement may be associated with: a panel lighting up "green" and displaying 'X' pressure value (green=pressure equalization reached); and a panel lighting up "red" and displaying 'X' pressure value (red=pressure equalization needs to be corrected). The indications of the open wellhead may be associated with: a panel lighting up "green" and displaying "open"; and a panel lighting up "red" and displaying "closed". The indications of the deploy drone may be associated with: a panel lighting up "green" and displaying "drone deployed"; and a panel lighting up "red" and displaying "drone waiting". The indications of the fluid flow rate may be associated with: a panel lighting up "green" and displaying 'X' rate (green=appropriate fluid flow); and a panel lighting up "red" and displaying 'X' pressure value (red=fluid flow needs to be corrected).

Next, regarding the local control functionality, the local controls may include, but are not limited to: a touch screen interface or manual buttons for control on the system/component (e.g., wellhead and/or pressure chamber), wired remote control located a safe distance from the machine/system, or any other control methods.

The local control functionalities may be associated with the status requests, the open wellhead, the deploy drone, and the wellhead fluid flow control.

The local controls for the status requests include: manually pressing buttons to initiate pressure equalization between the pressure chamber and the wellhead. The local controls for the open wellhead include: manually pressing buttons to initiate opening of the pressure chamber to the wellhead; manually pressing buttons to initiate opening of the wellhead to the pressure chamber—e.g., the same button may open both the pressure chamber and the wellhead simultaneously. The local controls for the deploy drone include: manually pressing buttons to initiate deployment of a drone into the wellhead—e.g., this button involves activating an electromechanical piston. The local controls for the wellhead fluid flow control include: manually adjusting a fluid flow control—e.g., increasing or decreasing of fluid flow.

Figure 20:
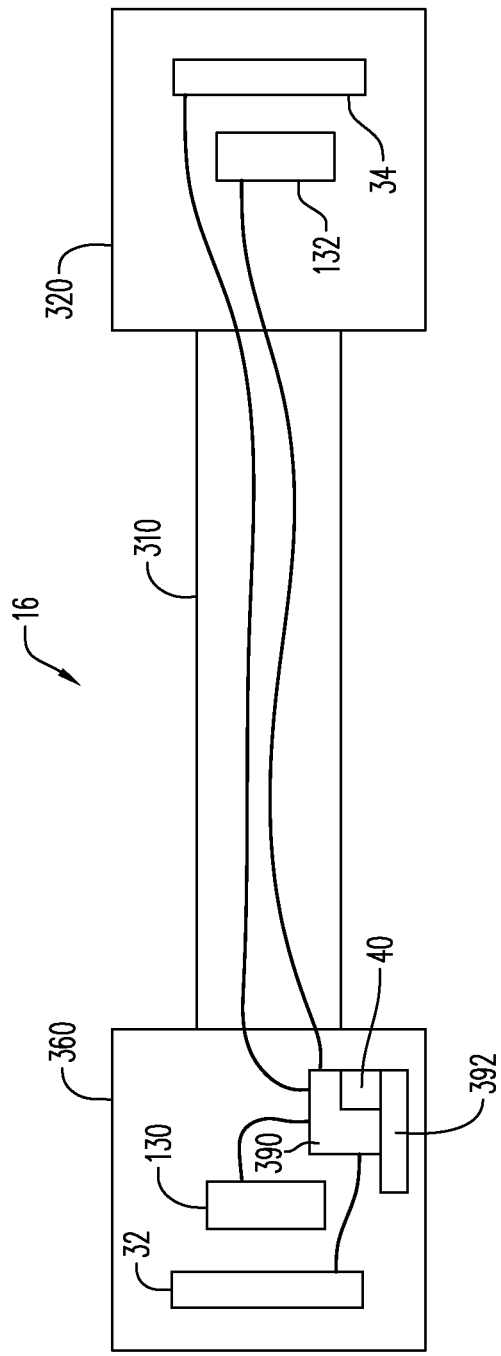
FIG. 20 is a block diagram, cross sectional view of a drone in accordance with an embodiment.

An embodiment of drone 16 disclosed herein is illustrated in FIG. 20, for example, may represent any type of drone. For example, the untethered drone 16 may take the form of the perforating gun shown in FIGS. 19A and 19B. The body portion 310 of the untethered drone 16 may bear one or more shaped charges 340. As is well-known in the art, detonation of the shaped charges 340 is typically initiated with an electrical pulse or signal supplied to a detonator. The detonator of the perforating gun embodiment of the untethered drone 16 may be located in the body portion 310 or adjacent the intersection of the body portion 310 and the head portion 320 or the tail portion 360 to initiate the shaped charges 340 either directly or through an intermediary structure such as a detonating cord 350.

As would be understood by one of ordinary skill in the art, electrical power typically supplied via the wireline cable 12 to wellbore tools, such as a tethered drone or typical perforating gun, would not be available to the untethered drone 16. In order for all components of the untethered drone 16 to be supplied with electrical power, a power supply 392 may be included as part of the untethered drone 16. The power supply 392 may occupy any portion of the drone 16, i.e., one or more of the body 310, head 320 or tail 360. It is contemplated that the power supply 392 may be disposed so that it is adjacent any components of the drone 16 that require electrical power.

An on-board power supply 392 for a drone 16 may take the form of an electrical battery; the battery may be a primary battery or a rechargeable battery. Whether the power supply 392 is a primary or rechargeable battery, it may be inserted into the drone at any point during construction of the drone 16 or immediately prior to insertion of drone 16 into the wellbore 16. If a rechargeable battery is used, it may be beneficial to charge the battery immediately prior to insertion of the drone 16 into the wellbore 16. Charge times for rechargeable batteries are typically on the order of minutes to hours.

In an embodiment, another option for power supply 392 is the use of a capacitor or a supercapacitor. A capacitor is an electrical component that consists of a pair of conductors separated by a dielectric. When an electric potential is placed across the plates of a capacitor, electrical current enters the capacitor, the dielectric stops the flow from passing from one plate to the other plate and a charge builds up. The charge of a capacitor is stored as an electric field between the plates. Each capacitor is designed to have a particular capacitance (energy storage). In the event that the capacitance of a chosen capacitor is insufficient, a plurality of capacitors may be used. When a capacitor is connected to a circuit, a current will flow through the circuit in the same way as a battery. That is, when electrically connected to elements that draw a current the electrical charge stored in the capacitor will flow through the elements. Utilizing a DC/DC converter or similar converter, the voltage output by the capacitor will be converted to an applicable operating voltage for the circuit. Charge times for capacitors are on the order of minutes, seconds or even less.

A supercapacitor operates in a similar manner to a capacitor except there is no dielectric between the plates. Instead, there is an electrolyte and a thin insulator such as cardboard or paper between the plates. When a current is introduced to the supercapacitor, ions build up on either side of the insulator to generate a double layer of charge. Although the structure of supercapacitors allows only low voltages to be stored, this limitation is often more than outweighed by the very high capacitance of supercapacitors compared to standard capacitors. That is, supercapacitors are a very attractive option for low voltage/high capacitance applications as will be discussed in greater detail hereinbelow. Charge times for supercapacitors are only slightly greater than for capacitors, i.e., minutes or less.

A battery typically charges and discharges more slowly than a capacitor due to latency associated with the chemical reaction to transfer the chemical energy into electrical energy in a battery. A capacitor is storing electrical energy on the plates so the charging and discharging rate for capacitors are dictated primarily by the conduction capabilities of the capacitors plates. Since conduction rates are typically orders of magnitude faster than chemical reaction rates, charging and discharging a capacitor is significantly faster than charging and discharging a battery. Thus, batteries provide higher energy density for storage while capacitors have more rapid charge and discharge capabilities, i.e., higher power density, and capacitors and supercapacitors may be an alternative to batteries especially in applications where rapid charge/discharge capabilities are desired.

Thus, an on-board power supply 392 for a drone 16 may take the form of a capacitor or a supercapacitor, particularly for rapid charge and discharge capabilities. A capacitor may also be used to provide additional flexibility regarding when the power supply is inserted into the drone 16, particularly because the capacitor will not provide power until it is charged. Thus, shipping and handling of a drone 16 containing shaped charges 340 or other explosive materials presents low risks where an uncharged capacitor is installed as the power supply 392. This is contrasted with shipping and handling of a drone 16 with a battery, which can be an inherently high risk activity and frequently requires a separate safety mechanism to prevent accidental detonation. Further, and as discussed previously, the act of charging a capacitor is very fast. Thus, the capacitor or supercapacitor being used as a power supply 392 for drone 16 can be charged immediately prior to deployment of the drone 16 into the wellbore 16.

While the option exists to ship a drone 16 preloaded with a rechargeable battery which has not been charged, i.e., the electrochemical potential of the rechargeable battery is zero, this option comes with some significant drawbacks. The goal must be kept in mind of assuring that no electrical charge is capable of inadvertently accessing any and all explosive materials in the drone 16. Electrochemical potential is often not a simple, convenient or failsafe thing to measure in a battery. It may be the case that the potential that a 'charged' battery may be mistaken for an 'uncharged' battery simply cannot be reduced sufficiently to allow for shipping a drone 16 with an uncharged battery. In addition, as mentioned previously, the time for charging a rechargeable battery having adequate power for drone 16 could be on the order of an hour or more. Currently, fast recharging batteries of sufficient charge capacity are uneconomical for the 'one-time-use' or 'several-time-use' that would be typical for batteries used in drone 16.

In an embodiment, electrical components like the computer/processor 390, other circuits or electrical components such as coils 32, 34, signal generating circuit 40 and the signal transceivers 130, 132 may be battery powered while explosive elements like the detonator (not shown) for initiating detonating cord 350 to cause detonation of the shaped charges 340, are capacitor powered. Such an arrangement would take advantage of the possibility that some or all of the computer/processor 390, the circuit 40, the coils 32, 34, and the transceivers 130, 132 may benefit from a high density power supply having higher energy density, i.e., a battery, while initiating elements such as detonators typically benefit from a higher power density, i.e., capacitor/supercapacitor. A very important benefit for such an arrangement is that the battery is completely separate from the explosive materials, affording the potential to ship the drone 16 preloaded with a charged or uncharged battery. The power supply that is connected to the explosive materials, i.e., the capacitor/supercapacitor, may be very quickly charged immediately prior to dropping drone 16 into wellbore 50.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower" etc. are used to identify one element from another, and unless otherwise specified are not meant to refer to a particular order or number of elements.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

As used in the claims, the word "comprises" and its grammatical variants logically also subtend and include phrases of varying and differing extent such as for example, but not limited thereto, "consisting essentially of" and "consisting of." Where necessary, ranges have been supplied, and those ranges are inclusive of all sub-ranges therebetween. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, the claimed features lie in less than all features of a single foregoing disclosed embodiment, configuration, or aspect. Thus, the following claims are hereby incorporated into this Detailed Description, with each claim standing on its own as a separate embodiment of the present disclosure.

Advances in science and technology may make equivalents and substitutions possible that are not now contemplated by reason of the imprecision of language; these variations should be covered by the appended claims. This written description uses examples to disclose the method, machine and computer-readable medium, including the best mode, and also to enable any person of ordinary skill in the art to practice these, including making and using any devices or systems and performing any incorporated methods. The patentable scope thereof is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. An on-board control system for a programmed wellbore drone, the system comprising:
    at least one control interface for generating a control command adapted to control the wellbore drone,
    wherein the wellbore drone comprises a wellbore tool configured to perform at least one action within a wellbore based on the control command,
    the wellbore drone further comprises:
        an internal power source connected to the wellbore tool and the on-board control system, wherein the internal power source is configured to be inactive to the wellbore tool and the on-board control system until the wellbore drone is deployed into the wellbore and one or more power trigger events occur,
    the one or more power trigger events comprise:
        matching of at least one of a location of the wellbore drone, a temperature measured by the wellbore drone and a pressure measured by the wellbore drone to a corresponding predetermined value; and
        receiving a mechanical force or an electromagnetic force provided from one or more markers placed within the wellbore, so that the mechanical force or the electromagnetic force activates the internal power source or a power connection output from the internal power source, and
    the location of the wellbore drone is determined by at least one of an external control system or the on-board control system, the location determination based on a flow speed of fluid along which the wellbore drone travels within the wellbore and a time passed after the wellbore drone is dispensed for being deployed into the wellbore.

2. The on-board control system of claim 1, further comprising:
    at least one processor configured to provide the control command to the wellbore tool; and
    a memory coupled to the at least one processor,
    wherein the control command is loaded into the memory, prior to the wellbore drone being deployed into the wellbore.

3. The on-board control system of claim 1, wherein the at least one action comprises positioning, deploying, activating, or detonating the wellbore tool.

4. The on-board control system of claim 1, wherein the wellbore drone further comprises a communication unit, wherein the location of the wellbore drone is determined based on one or more location indications received from one or more location markers placed within the wellbore through the communication unit.

5. The on-board control system of claim 1, further comprising one or more sensors, wherein the temperature or the pressure measured by the wellbore drone is determined based on a signal received from the one or more sensors.

6. The on-board control system of claim 1, wherein prior to the wellbore drone being deployed, the wellbore drone is powered by an external power source via a wired or wireless connection.

7. A method for controlling a wellbore drone comprising a wellbore tool for deployment into a wellbore, the method comprising:
    providing, by an on-board control system embedded in the wellbore drone, a control command to the wellbore tool;
    receiving, by the wellbore tool, the control command from the on-board control system; and performing, by the wellbore tool, at least one action within the wellbore based on the received control command, the wellbore drone further comprises:
an internal power source connected to the wellbore tool and the on-board control system, wherein the internal power source is configured to be inactive to the wellbore tool and the on-board control system until the wellbore drone is deployed into the wellbore and one or more power trigger events occur, the one or more power trigger events comprise:
matching of at least one of a location of the wellbore drone, a temperature measured by the wellbore drone and a pressure measured by the wellbore drone to a corresponding predetermined value; and receiving a mechanical force or an electromagnetic force provided from one or more markers placed within the wellbore, so that the mechanical force or the electromagnetic force activates the internal power source or a power connection output from the internal power source, and the location of the wellbore drone is determined by at least one of an external control system or the on-board control system, the location determination based on a flow speed of fluid along which the wellbore drone travels within the wellbore and a time passed after the wellbore drone is dispensed for being deployed into the wellbore.

8. The method of claim 7, wherein the control command is loaded into the on-board control system, prior to the wellbore drone being deployed into the wellbore.

9. The method of claim 7, wherein the at least one action comprises positioning, deploying, activating, or detonating the wellbore tool.

10. The method of claim 7, further comprising:
inactivating an internal power source connected to the wellbore tool until the wellbore drone is deployed into the wellbore and one or more power trigger events occur.

11. The method of claim 7, further comprising:
inactivating an internal power source connected to the wellbore tool and to the on-board control system until the wellbore drone is deployed into the wellbore and one or more power trigger events occur.

12. The method of claim 10, wherein the one or more power trigger events comprise:
matching at least one of a location of the wellbore drone, a temperature inside/outside the wellbore drone, or a pressure inside/outside the wellbore drone to a corresponding predetermined value; and receiving a mechanical force or an electromagnetic force provided from one or more markers placed within the wellbore, so that the mechanical force or the electromagnetic force activates the internal power source or a power connection output from the internal power source.

13. A wellbore drone control and deployment system, comprising:
a wellbore drone for being deployed into a wellbore, the wellbore drone being configured to perform at least one action based on a control command, the control command being provided from an on-board control system embedded in the wellbore drone;

a magazine unit comprising one or more chambers, the magazine unit being configured to:
retain the wellbore drone in a corresponding one of the one or more chambers, prior to deployment of the wellbore drone into the wellbore, and
dispense the wellbore drone for being deployed into the wellbore through a launcher unit; and a control system comprising at least one control interface adapted to control at least a part of operations of the wellbore drone and the magazine unit;

the wellbore drone further comprises:
an internal power source connected to the wellbore tool and the on-board control system, wherein the internal power source is configured to be inactive to the wellbore tool and the on-board control system until the wellbore drone is deployed into the wellbore and one or more power trigger events occur, the one or more power trigger events comprise:
matching of at least one of a location of the wellbore drone, a temperature measured by the wellbore drone and a pressure measured by the wellbore drone to a corresponding predetermined value; and receiving a mechanical force or an electromagnetic force provided from one or more markers placed within the wellbore, so that the mechanical force or the electromagnetic force activates the internal power source or a power connection output from the internal power source, and the location of the wellbore drone is determined by at least one of an external control system or the on-board control system, the location determination based on a flow speed of fluid along which the wellbore drone travels within the wellbore and a time passed after the wellbore drone is dispensed for being deployed into the wellbore.

14. The system of claim 13, further comprising an external power source, wherein
prior to the deployment of the wellbore drone, the wellbore drone is powered by the external power source, and
after the deployment of the wellbore drone into the wellbore, the wellbore drone is not powered until one or more power trigger events occur.

15. The system of claim 14, wherein the one or more power trigger events comprise:
matching of at least one of a location of the wellbore drone, a temperature measured by the wellbore drone, or a pressure measured by the wellbore drone to a corresponding predetermined value; and receiving a mechanical force or an electromagnetic force provided from one or more markers placed within the wellbore, so that the mechanical force or the electromagnetic force activates the internal power source or a power connection output from the internal power source.

16. The system of claim 13, wherein the wellbore drone includes a memory, and wherein the control command is loaded into the memory via the control interface, prior to the wellbore drone being deployed into the wellbore.

* * * * *

UNITED STATES PATENT AND TRADEMARK OFFICE
CERTIFICATE OF CORRECTION

| | | |
|---|---|---|
| PATENT NO. | : 11,808,098 B2 | Page 1 of 1 |
| APPLICATION NO. | : 17/269871 | |
| DATED | : November 7, 2023 | |
| INVENTOR(S) | : Andreas Robert Zemla et al. | |

It is certified that error appears in the above-identified patent and that said Letters Patent is hereby corrected as shown below:

In the Claims

At Column 29, Claim 7, Line number 4, please add the word --wherein-- at the beginning of the line.

At Column 30, Claim 13, Line number 13, please add the word --wherein-- at the beginning of the line.

Signed and Sealed this
Thirteenth Day of February, 2024

*Katherine Kelly Vidal*

Katherine Kelly Vidal
*Director of the United States Patent and Trademark Office*